(12) United States Patent
Rekaya et al.

(10) Patent No.: US 11,888,655 B2
(45) Date of Patent: Jan. 30, 2024

(54) DEVICES AND METHODS FOR MACHINE LEARNING ASSISTED SPHERE DECODING

(71) Applicant: INSTITUT MINES-TELECOM, Palaiseau (FR)

(72) Inventors: Ghaya Rekaya, Antony (FR); Aymen Askri, Palaiseau (FR)

(73) Assignee: INSTITUT MINES TELECOM, Palaiseau (FR)

(*) Notice: Subject to any disclaimer, the term of this patent is extended or adjusted under 35 U.S.C. 154(b) by 202 days.

(21) Appl. No.: 17/620,715

(22) PCT Filed: Jun. 23, 2020

(86) PCT No.: PCT/EP2020/067396
§ 371 (c)(1),
(2) Date: Dec. 19, 2021

(87) PCT Pub. No.: WO2021/001199
PCT Pub. Date: Jan. 7, 2021

(65) Prior Publication Data
US 2022/0247605 A1    Aug. 4, 2022

(30) Foreign Application Priority Data
Jul. 1, 2019   (EP) .................................... 19305886

(51) Int. Cl.
*H04L 25/03*   (2006.01)
*G06N 20/10*   (2019.01)
*G06N 3/048*   (2023.01)

(52) U.S. Cl.
CPC ....... *H04L 25/03242* (2013.01); *G06N 3/048* (2023.01); *G06N 20/10* (2019.01);
(Continued)

(58) Field of Classification Search
CPC ..... H04L 25/03242; H04L 2025/03458; H04L 2025/03464; G06N 3/048; G06N 20/10;
(Continued)

(56) References Cited

U.S. PATENT DOCUMENTS 11,115,160 B2 * 9/2021 Shattil .................. H04L 5/0005
2008/0313252 A1 12/2008 Kim et al.
(Continued)

OTHER PUBLICATIONS

Viterbo, et al., "A Universal Lattice Code Decoder for Fading Channels", IEEE Transactions on Information Theory, 45(5), pp. 1639-1642, 1999.
(Continued)

*Primary Examiner* — Vineeta S Panwalkar
(74) *Attorney, Agent, or Firm* — BakerHostetler

(57) ABSTRACT

A decoder for decoding a signal received through a transmission channel represented by a channel matrix using a search sphere radius. The decoder comprises a radius determination device for determining a search sphere radius from a preliminary radius. The radius determination device is configured to: i. apply a machine learning algorithm to input data derived from the received signal, the channel matrix and a current radius, the current radius being initially set to the preliminary radius, which provides a current predicted number of lattice points associated with the current radius; ii. compare the current predicted number of lattice points to a given threshold; iii. update the current radius if the current predicted number of lattice points is strictly higher than the given threshold, the current radius being updated by applying a linear function to the current radius; Steps i to iii are iterated until a termination condition is satisfied, the termination condition being related to the current predicted number, the radius determination device being configured to set the search sphere radius to the current radius in response to the termination condition being satisfied.

15 Claims, 7 Drawing Sheets

(52) U.S. Cl.
CPC ............... *H04L 2025/03458* (2013.01); *H04L 2025/03464* (2013.01)

(58) Field of Classification Search
CPC ............ G06N 7/01; G06N 5/01; G06N 3/084; G06N 20/00; G06N 3/047; Y02D 30/70
See application file for complete search history.

(56) References Cited

U.S. PATENT DOCUMENTS

| | | | | |
|---|---|---|---|---|
| 2017/0294986 | A1* | 10/2017 | Khsiba | .................. H04L 1/0054 |
| 2018/0357530 | A1 | 12/2018 | Beery et al. | |
| 2018/0367192 | A1 | 12/2018 | O'Shea et al. | |
| 2021/0011865 | A1* | 1/2021 | Gomony | ............. G06F 13/1678 |

OTHER PUBLICATIONS

Zhao, et al., "Sphere Decoding Algorithms With Improved Radius Search", IEEE Transactions on Communications, vol. 53, Issue: 7, pp. 1104-1109, Jul. 2005.

Hassibi, et al., "On the Expected Complexity of Sphere Decoding", Conference Record of Thirty-Fifth Asilomar Conference on Signals, Systems and Computers (Cat. No. 01CH37256), pp. 1051-1055, 2001.

El-Khamy, et al., "Reduced complexity list sphere decoding for MIMO systems", Digital Signal Processing, vol. 25, pp. 84-92, 2014.

Ben-Othman, et al., "The spherical bound stack decoder", IEEE International Conference on Wireless & Mobile Computing, Networking & Communication, 2008.

Viterbo, et al., "A universal decoding algorithm for lattice codes", GRETSI, Groupe d'Etudes du Traitement du Signal et des Images, 1993.

Mohammadkarimi, et al., "Deep Learning-Based Sphere Decoding", IEEE Transactions on Wireless Communications, vol. 18, Issue: 9, Sep. 2019.

Corlay, et al., "Multilevel MIMO Detection with Deep Learning", 2018 52nd Asilomar Conference on Signals, Systems, and Computers, pp. 1805-1809, 2018.

Khsiba, et al., "Sphere decoder with dichotomic search", 2017 IEEE 28th Annual International Symposium on Personal, Indoor, and Mobile Radio Communications (PIMRC), 2017.

Askri, et al., "DNN assisted Sphere Decoder", 2019 IEEE International Symposium on Information Theory (ISIT), pp. 1172-1176, 2019.

* cited by examiner

100

200

300

DEVICES AND METHODS FOR MACHINE LEARNING ASSISTED SPHERE DECODING

CROSS-REFERENCE TO RELATED APPLICATIONS

This application is a National Stage of International patent application PCT/EP2020/067396, filed on Jun. 23, 2020, which claims priority to foreign European patent application No. EP 19305886.4, filed on Jul. 1, 2019, the disclosures of which are incorporated by reference in their entirety.

TECHNICAL FIELD

The invention generally relates to digital communications and in particular to methods and devices for decoding a data signal.

BACKGROUND

The 'smart revolution' has made significant changes in all aspects of modern lives including communications, business, health services and education. From smart phones, smart watches and smart cars to smart homes and smart cities, an increasing number of smart devices are being massively used and changing communication systems.

With the advent of such web-enabled and connected devices, there is a growing need for more system capacity. Multiple-input multiple-output (MIMO) technologies were developed to increase such system capacity and offer better link reliability. MIMO systems exploit the space and time dimensions to encode and multiplex more data symbols using a multiplicity of transmit and/or receive antennas, over a plurality of time slots. As a result, the capacity, range, and reliability of MIMO-based communication systems can be enhanced. Such key benefits of MIMO technologies make them ideal candidates in many wired, wireless and optical communication systems applied for example in local and wide area networks.

One major challenge for MIMO systems is to adapt to increasing demands in terms of data rates for real-time services and applications. Another challenge relates to the complexity and energy consumption of the signal processing at transceiver devices. In particular, a demanding challenge concerns the development of MIMO decoders that are capable of offering the required quality of service while consuming low power and low computational resources.

A MIMO decoder implemented in a receiver device is configured to determine, from the received signal and a channel matrix, an estimation of the originally conveyed information symbols. The decoder performs a comparison between the received signal and the possible values of the transmitted vector of information symbols.

Several decoding algorithms exist and their practical use differs depending on the performance required in the quality of service (QoS) specifications and the available hardware resources, such as the computational and memory (storage) supplies. In the presence of equally probable information symbols, optimal decoding performance is obtained by applying the Maximum Likelihood (ML) decoding criterion. An ML decoder provides optimal performance.

The ML estimation problem can be solved using two different but equivalent representations of the MIMO system: a lattice representation and a tree representation.

In a lattice representation, a MIMO system is associated with a lattice generated by the channel matrix. According to such representation, each possible value of the vector of information symbols is represented by a point in the lattice. The received signal is seen as a point of the lattice disturbed by a noise vector. Solving for the ML solution thus amounts to solve a closest vector problem. The ML solution corresponds in such case to the nearest lattice point to the received signal in the sense of the minimization of the Euclidean Distance. The computational complexity of finding the ML solution depends on the number of examined lattice points during the search for the closest lattice point.

Sphere tree-search-based estimation algorithms such as the Sphere decoder and the Spherical-Bound Stack decoder (SB-Stack) have been proposed to reduce the complexity of the search phase by limiting the search space for the closest lattice point to a spherical region of a given radius. The sphere decoder is disclosed in "E. Viterbo and J. Boutros, A Universal Lattice Code Decoder for Fading Channels, IEEE Transactions on Information Theory, 45(5), pages 1639-1642, 1999" and the SB-Stack decoder is disclosed in "G. Rekaya Ben-Othman et al., The Spherical Bound Stack Decoder, In Proceedings of the IEEE International Conference on Wireless and Mobile Computing, Networking and Communications, 2008".

Departing from a given radius (hereinafter referred to as 'initial sphere radius' or 'search sphere radius'), sphere search-based estimation algorithms search for a first lattice point associated with one of the possible values of the vector of information symbols inside a spherical region of a radius equal to the given radius. Upon finding a lattice point, the value of the sphere radius is updated to the value of the Euclidean distance between the lattice point found in the spherical region and the point representing the received signal. This sphere-constrained search and the radius update are performed iteratively until finding the ML solution which corresponds to the smallest sphere that comprises a lattice point and that is centered at the point representing the received signal.

Such search space limitation is seen, according to a tree representation of the MIMO system, as a limitation of the number of visited nodes in the decoding tree. The radius of the spherical region determines bound limits on the visited nodes at each level of the decoding tree. Only nodes that belong to the intervals imposed by these bound limits are visited during the tree-search process. Limiting the search space enables a reduction on the computational complexity of searching for the ML solution compared to some sequential decoders such as the Stack decoder.

The computational complexity of the tree-search phase depends critically on the choice of the search sphere radius. Accordingly, a main issue of such decoders is the selection of the sphere radius initially set to initiate the search of lattice points. Specifically, to include at least one lattice point inside the sphere, the initial radius is required to be large enough. In contrast, a smaller initial radius shall be preferred to avoid an exponential search as a too large radius fosters the presence of many lattice points inside the sphere. Accordingly, a relevant trade-off shall be found between a large-enough initial radius for ensuring that at least one lattice point is included inside the sphere and a small-enough radius to optimize the computational complexity and greatly speed up the decoder.

Several methods have been proposed to select the search sphere radius. In one approach, the covering radius of the lattice generated by the channel matrix is considered. In still another approach, an upper bound of the covering radius is used as further disclosed in the article "A universal decoding algorithm for lattice codes", In 14$^{th}$ colloque GRETSI, 1993, by E. Viterbo and E. Biglieri. However, such selection methods based on the cover radius or the upper bound suffer from high computational complexity as an increasing number of lattice points are visited.

In yet another approach, the search sphere radius can be selected taking into account the statistical characteristics of the noise power according to a method referred to as SDIRS (for 'Sphere Decoder with Improved Radius Search') disclosed in "W. Zhao and G. B. Giannakis, Sphere Decoding Algorithms with Improved Radius Search, In Proceedings of IEEE Transactions on Communications, 53(7):1104-1109, July 2005". One major drawback of this method for initial radius selection is that it generates an increase of the initial radius. Indeed, when the initial radius is too small to succeed in searching at least one lattice point inside a sphere having the initial radius, the radius is increased until at least one lattice point is found inside the sphere.

Further, with such approaches, the number of lattice points included inside the sphere increases as the radius increases so that too many lattice points can be included inside the sphere, which greatly increases the decoder complexity.

Yet another solution for selecting the initial radius is based on considering the Euclidean distance between the received signal and the Zero Forcing (ZF) estimate, as disclosed in US2008/0313252 or in the article "B. Hassibi and H. Vikalo, On the Expected Complexity of Sphere Decoding, In Proceedings of Asilomar Conference on Signals, Systems and Computers, vol. 2, pages 1051-1055, November 2001". This ensures that the ZF estimate and at least one lattice point are included inside the sphere. However, this solution suffers from high computational complexity.

Further, another solution for selecting the initial radius based on a dichotomic search is disclosed in "M-A. Khsiba and G. Rekaya-Ben Othman, Sphere Decoder with Dichotomic Search, PIMRC, Montreal, CANADA, October 2017". The Sphere Decoder with dichotomic search implements a dichotomy-wise radius update strategy in which the radius update performed during the search of a lattice points inside the spherical region is based on dividing the current radius by two each time a valid lattice point is found.

Although the selection of the initial radius with such methods ensures that a plurality of lattice points are included within a sphere having the initial radius, the initial radius may be still too large thereby increasing the computational complexity of the decoder.

There is accordingly a need for sphere radius determination devices that enable achieving optimal ML performance with a fast decoding convergence and a reduced decoding complexity.

SUMMARY

In order to address these and other problems, it is provided a decoder configured to decode a signal received through a transmission channel represented by a channel matrix using a search sphere radius, the decoder comprising a radius determination device for determining the search sphere radius from a preliminary radius. The radius determination device is configured to:
  i. apply a machine learning algorithm to input data derived from the received signal, the channel matrix and a current radius, the current radius being initially set to the preliminary radius, which provides a current predicted number of lattice points associated with the current radius;
  ii. compare the current predicted number of lattice points to a given threshold;
  iii. update the current radius if the current predicted number of lattice points is strictly higher than the given threshold, the current radius being updated by applying a linear function to the current radius;
  steps i to iii being iterated until a termination condition is satisfied, the termination condition being related to the current predicted number, the radius determination device being configured to set the search sphere radius to the current radius in response to the termination condition being satisfied.

According to some embodiments, the termination condition may be satisfied if the current predicted number of lattice points is smaller than or equal to the given threshold.

According to some embodiments, the linear function may have a slope parameter equal to ½ and an intercept parameter equal to zero.

According to some embodiments, the machine learning algorithm may a supervised machine learning algorithm chosen in a group comprising Support Vector Machines, linear regression, logistic regression, naive Bayes, linear discriminant analysis, decision trees, k-nearest neighbor algorithm, neural networks, and similarity learning.

According to some embodiments, the supervised machine learning algorithm may be a multilayer deep neural network comprising an input layer, one or more hidden layers, and an output layer, each layer comprising a plurality of computation nodes, the multilayer deep neural network being associated with model parameters and an activation function, the activation function being implemented in at least one computation node among the plurality of computation nodes of the one or more hidden layers.

According to some embodiments, the activation function may be chosen in a group comprising a linear activation function, a sigmoid function, a Relu function, the Tanh, the softmax function, and the CUBE function.

According to some embodiments, the radius determination device may be configured to previously determine the model parameters during a training phase from received training data, the radius determination device being configured to determine a plurality of sets of training data from the training data and expected numbers of lattice points, each expected number of lattice points being associated with a set of training data among the plurality of sets of training data, the training phase comprising two or more iterations of the following steps:
  processing the deep neural network using a set of training data among the plurality of training data as input, which provides an intermediate number of lattice points associated with the set of training data;
  determining a loss function from the expected number of lattice points and the intermediate number of lattice points associated with the set of training data, and
  determining updated model parameters by applying an optimization algorithm according to the minimization of the loss function.

According to some embodiments, the optimization algorithm may be chosen in a group comprising the Adadelta optimization algorithm, the Adagrad optimization algorithm, the adaptive moment estimation algorithm, the Nesterov accelerated gradient algorithm, the Nesterov-accelerated adaptive moment estimation algorithm, the RMSprop algorithm, stochastic gradient optimization algorithms, and adaptive learning rate optimization algorithms.

According to some embodiments, the loss function may be chosen in a group comprising a mean square error function and an exponential log likelihood function.

According to some embodiments, the radius determination device may be configured to previously determine the expected numbers of lattice points from the search sphere radius and the channel matrix by applying a list sphere decoding algorithm or a list spherical-bound stack decoder.

According to some embodiments, the radius determination device may be configured to determine the preliminary radius from at least one parameter among a noise variance, diagonal components of the channel matrix, and an Euclidean distance representing a distance between the received signal and an estimate vector, the estimate vector being determined by applying a suboptimal estimation algorithm, the suboptimal estimation algorithm being chosen in a group comprising a Zero-Forcing Decision Feedback Equalizer and a Minimum Mean Square Error estimation algorithm.

According to some embodiments, the radius determination device may configured to determine the number of iterations of steps i to iii as a linear function of a signal to noise ratio, the linear function of the signal to noise ratio being defined by a slope coefficient and an intercept coefficient, the intercept coefficient being related to a transmit power, to the given threshold, and to a determinant of the channel matrix.

According to some embodiments, the decoder may further comprise a symbol estimation unit configured to determine at least one estimate of a vector of information symbols carried by the received signal by applying a sphere search-based estimation algorithm that determines the at least one estimate of vector of information symbols from lattice points found inside a spherical region centered at a point representing the received signal and defined by the search sphere radius.

According to some embodiments, the sphere search-based estimation algorithm may be chosen among a group comprising the sphere decoder and the spherical-bound stack decoder.

There is also provided a method for decoding a signal received through a transmission channel represented by a channel matrix using a search sphere radius, the method comprises determining the search sphere radius from a preliminary radius and:
i. applying a machine learning algorithm to input data derived from the received signal, the channel matrix and a current radius, the current radius being initially set to the preliminary radius, which provides a current predicted number of lattice points associated with the current radius;
ii. comparing the current predicted number of lattice points to a given threshold;
iii. updating the current radius if the current predicted number of lattice points is strictly higher than the given threshold, the current radius being updated by applying a linear function to the current radius.

Steps i to iii may be iterated until a termination condition is satisfied, the termination condition being related to the current predicted number, the method comprises setting the search sphere radius to the current radius in response to the termination condition being satisfied.

Advantageously, the embodiments of the invention provide efficient sphere radius design and controlling techniques that allow reducing the complexity of sphere search-based sequential ML decoders without compromising the decoding error performance.

Advantageously, the embodiments of the invention enable accelerating the convergence time of sequential sphere search-based ML decoders by reducing the number of visited lattice points during the search for the ML solution. The embodiments of the invention are especially adapted for high-dimensional systems involving a high number of transmit and/or receive antennas.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Figure 1:
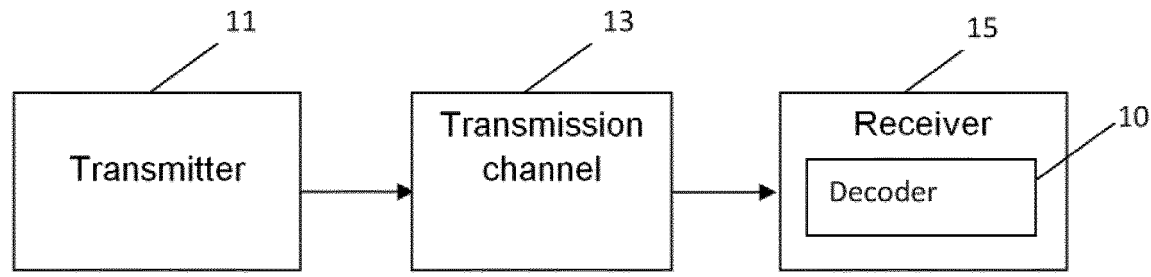
FIG. 1 is a schematic diagram of an exemplary application of the invention in communication systems.

Embodiments of the invention provide devices, methods, and computer programs for decoding a vector of information symbols from a signal received through a transmission channel in a communication system with a reduced computational complexity. In particular, embodiments of the invention provide methods, devices and computer program products for an efficient design and control of the search sphere radius used in sphere search-based ML sequential decoders comprising the Sphere decoder and the Spherical-Bound Stack decoder. The design and control of the search sphere radius according to the embodiments of the invention relies on machine learning techniques.

To facilitate the understanding of the description of some embodiments of the invention, there follows some definitions and notations.

$\Lambda$ refers to an n-dimensional lattice constructed over the Euclidean space $\mathbb{R}^n$ and represents an additive discrete subgroup of the Euclidean space $\mathbb{R}^n$. The lattice $\Lambda$ is spanned by the n linearly independent vectors $v_1, \ldots, v_n$ of $\mathbb{R}^n$ and is given by the set of integer linear combinations according to:

$$\Lambda = \left\{ u = \sum_{i=1}^{n} a_i v_i, a_i \in \mathbb{Z}, v_i \in \mathbb{R}^n \right\} \quad (1)$$

A lattice generator matrix $H \in \mathbb{R}^{n \times n}$, refers to a real-value matrix that comprises real-value components $H_{ij} \in \mathbb{R}$. A lattice point u that belongs to the lattice $\Lambda$ is a n-dimensional vector, $u \in \mathbb{R}^n$, that can be written as function of the lattice generator matrix H according to:

$$u = Hs, s \in \mathbb{Z}^n \quad (2)$$

$m(\bullet) = \|\bullet\|_2$ defines the Euclidean metric (also referred to as 'the Euclidean distance') as the distance between two points in the Euclidean Space.

The closest vector problem refers to an optimization problem that aims at finding, given a vector v in the Euclidean vector space $\mathbb{R}^n$, the vector u in the lattice $\Lambda$ that is the closest to the vector v, the distance between the vector v and the vector u being measured by the metric m. The closest vector problem remains to solve the optimization problem given by:

$$u_{cvp} = \underset{u \in \Lambda \setminus \{O\}}{\operatorname{argmin}} m(v - u) \quad (3)$$

$r_0$ designates a preliminary sphere radius.

$r_s$ designates a search sphere radius (also referred to as 'initial sphere radius') used in a sphere search-based estimation algorithms during the search phase of the decoding process.

$D(K, \theta_{k=1, \ldots, K}, \sigma)$ refers to a multilayer deep neural network made up of an input layer and $K \geq 2$ layers comprising one or more hidden layers and an output layer, and artificial neurons (hereinafter referred to as 'nodes' or 'computation nodes') connected to each other. The number of layers K represents the depth of the deep neural network and the number of nodes in each layer represents the width of the deep neural network. $N^{(k)}$ designates the width of the $k^{th}$ layer and corresponds to the number of computation nodes in the $k^{th}$ layer.

The multilayer deep neural network is associated with model parameters denoted $\theta_{k=1, \ldots, K}$ and an activation function denoted $\sigma$. The activation function $\sigma$ refers to a computational non-linear function that defines the output of a neuron in the hidden layers of the multilayer deep neural network. The model parameters $\theta_{k=1, \ldots, K}$ comprise sets of parameters $\theta_k$ for $k=1, \ldots, K$, the $k^{th}$ set $\theta_k = \{W^{(k)} \in \mathbb{R}^{N^{(k)} \times N^{(k-1)}}; b^{(k)} \in \mathbb{R}^{N^{(k)}}\}$ designating a set of layer parameters associated with the $k^{th}$ layer of the multilayer deep neural network comprising:

a first layer parameter, denoted by $W^{(k)} \in \mathbb{R}^{N^{(k)} \times N^{(k-1)}}$, designating a weight matrix comprising real-value coefficients, each coefficient representing a weight value associated with a connection between a node that belongs to the $k^{th}$ layer and a node that belongs to the $(k-1)^{th}$ layer;

a second layer parameter, denoted by $b^{(k)} \in \mathbb{R}^{N^{(k)}}$, designating a vector of bias values associated with the $k^{th}$ layer.

L designates a loss function and refers to a mathematical function used to estimate the loss (also referred to as 'the error' or 'cost') between estimated (also referred to as 'intermediate') and expected values during a training process of the deep neural network.

An optimizer (hereinafter referred to as 'an optimization algorithm' or 'a gradient descent optimization algorithm') refers to an optimization algorithm used to update parameters of the deep neural network during a training phase.

Epochs refer to the number of times the training data have passed through the deep neural network in the training phase.

A mini-batch refers to a sub-set of training data extracted from the training data and used in an iteration of the training phase. The mini-batch size refers to the number of training data samples in each partitioned mini-batch.

The learning rate (also referred to as 'a step size') of a gradient descent algorithm refers to a scalar value that is multiplied by the magnitude of the gradient.

The embodiments of the invention provide devices, methods and computer program products that enable, in general, solving the closest vector problem using sphere search-based sequential algorithms (also referred to as 'sphere search-based estimation algorithms') with a reduced complexity. The closest vector problem arises in several fields and applications comprising, without limitation, computer sciences, coding, digital communication and storage, and cryptography. The embodiments of the invention may accordingly be implemented in a wide variety of digital systems designed to store, process, or communicate information in a digital form. Exemplary applications comprise, without limitations:

digital electronics;

communications (e.g. digital data encoding and decoding using lattice-structured signal constellations);

data processing (e.g. in computing networks/systems, data centers);

data storage (e.g. cloud computing);

cryptography (e.g. coding in wire-tap channels)

etc.

Exemplary digital systems comprise, without limitations:

communication systems (e.g. radio, wireless, single-antenna communication systems, multiple-antenna communication systems, optical fiber-based communication systems);

communication devices (e.g. transceivers in single-antenna or multiple-antenna devices, base stations, relay stations for coding and/or decoding digital uncoded or coded signals represented by signal constellations, mobile phone devices, computers, laptops, tablets, drones, IoT devices);

cryptographic systems and devices used for communication, data processing, or storage implementing lattice-based encryption schemes (e.g. GGH encryption scheme and NTRUEEncrypt), lattice-based signatures (e.g. GGH signature scheme), and lattice-based hash functions (e.g. SWIFFT and LASH);

positioning systems (e.g. in GNSS for integer ambiguity resolution of carrier-phase GNSS);

etc.

The embodiments of the invention may be in particular implemented in communication systems to determine an estimate of a vector of information symbols conveyed from one or more transmitter devices to a receiver device, the estimation problem being equivalent to solving a closest vector problem in a lattice generated by a channel matrix representative of the transmission channel.

The following description of some embodiments of the invention will be made mainly with reference to communication systems, for illustration purpose only. However, the skilled person will readily understand that the various embodiments of the invention may be applied to other types of systems such as signal processing systems, cryptographic systems, and positioning systems.

FIG. 1 is a block diagram of an exemplary application to a communication system 100, according to some embodiments. The communication system 100 may be wired, wireless, or optical (e.g. optical fiber-based). The communication system 100 may comprise at least one transmitter device 11 (hereinafter referred to as a "transmitter") configured to transmit a plurality of information symbols to at least one receiver device 15 (hereinafter referred to as "receiver") through a transmission channel 13. The receiver 15 may include a MIMO decoder 10 (also referred to as 'a decoder' or 'a Space-Time decoder') to decode the information symbols sent by one or more transmitter devices 11. The transmission channel 13 may be any wired connection, wireless medium, or optical link.

In an application of the invention to radio communications, the communication system 100 may be a wireless single-user MIMO system comprising a wireless transmitter device 11 configured to communicate a flow of information symbols representing an input data and a wireless receiver device 15, configured to decode the conveyed symbols by the transmitter 11.

The transmitter device 11 may be equipped with one or more transmit antennas and the receiver device 15 may be equipped with one or more receive antennas, the number $n_t$ of transmit antennas the number $n_r$ of receive antennas being greater than or equal to one.

In another application of the invention to radio communications, the communication system 100 may be a wireless multi-user MIMO system in which a plurality of wireless transmitter devices 11 and receiver devices 15 communicate with each other. In such embodiments, the communication system 100 may further use, alone or in combination, any multiple access technique such as Time Division Multiple Access (TDMA), Frequency Division Multiple Access (FDMA), Code Division Multiple Access (CDMA), and Space-Division Multiple Access (SDMA).

In an application of the invention to optical communications (e.g. free space optical communications and satellite communications), the communication system 100 may be an optical fiber-based communication system. The transmitter 11 and receiver 15 may be accordingly any optical transceiver capable of operating in optical fiber-based transmission systems. The transmission channel 13 may be any optical fiber link designed to carry data over short or long distances. Exemplary applications using optical fiber links over short distances comprise high-capacity networks such as data center interconnections. Exemplary applications using optical fiber links over long distances comprise terrestrial and transoceanic transmissions. In such embodiments, the information symbols conveyed by the transmitter 11 may be carried by optical signals polarized according to the different polarization states of the fiber. The optical signals propagate along the fiber-based transmission channel 11, according to one or more propagation modes, until reaching the receiver 15.

In another application of the invention to optical communications, the optical signal carrying the information symbols may be generated using a single wavelength lasers.

In other embodiments, wavelength division multiplexing (WDM) techniques may be used at the transmitter 11 to enable generating optical signals using a plurality of independent wavelengths.

In still another application of the invention to optical communication systems using multi-mode and/or multi-core fibers, space division multiplexing techniques may be used to multiplex the information symbols according to the various propagation modes.

Further, a multiple access technique such as WDMA (Wavelength Division Multiple Access) may be used in some applications of the invention to optical communication systems.

The transmission channel 13 may be any linear Additive White Gaussian Noise (AWGN) channel or a multipath channel using single-carrier or multi-carrier modulation formats such as OFDM (Orthogonal Frequency Division Multiplexing) and FBMC (Filter Bank Multi-Carrier) for mitigating frequency-selectivity, interference and delays.

For illustration purposes only, the following description will be made with reference to a wireless single-user MIMO system accommodating a transmitter device 11 equipped with $n_t \geq 1$ transmit antennas and a receiver device 15 equipped with $n_r \geq 1$ receive antennas for decoding information symbols sent by the transmitter 11. However, the skilled person will readily understand that embodiments of the invention apply to other communication systems such as wireless multi-user MIMO systems and optical MIMO systems. More generally, the invention may be applied to any communication system characterized by a linear representation (equivalently a lattice representation) of the channel output at receiver devices. In addition, although not limited to such embodiments, the invention has particular advantages in the presence of a number of transmit antennas greater than or equal to two and/or a number of receive antennas greater than or equal to two.

Figure 2:
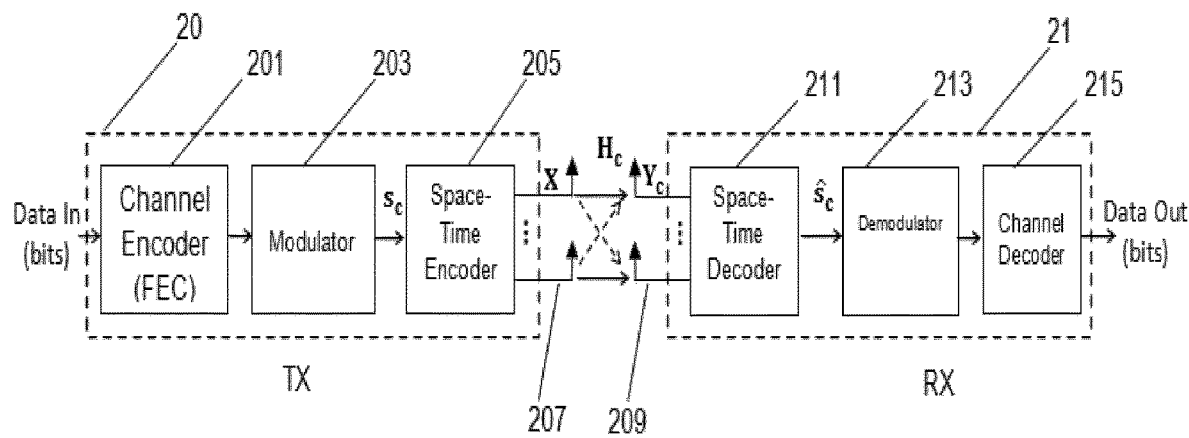
FIG. 2 is a schematic diagram of an implementation of a Space-Time decoder in a wireless single-user MIMO system, according to some embodiments.

Referring to FIG. 2, there is shown an exemplary wireless single-user MIMO communication system 200 in which various embodiments of the present invention may be implemented. The wireless single-user MIMO communication system 200 may comprise a transmitter 20 implementing a Space-Time Block Code (STBC) to multiplex the information symbols over time and space dimensions (i.e. over the transmit antennas). Each transmitter 20 of a station may exchange data with a receiver 21 of another station according to the wireless communication system 200.

The wireless single-user MIMO communication system 200 may present a symmetric configuration. As used herein, a symmetric configuration refers to a configuration in which the transmitter 20 and the receiver 21 are equipped with the same number of antennas $n_t = n_r$. Alternatively, the MIMO configuration may be asymmetric, the number $n_r$ of receive antennas differing from the number $n_t$ of transmit antennas.

In particular, in one embodiment, in order to avoid a rank deficiency problem, the number $n_r$ of receive antennas may be larger than the number $n_t$ of antennas at the transmitter. Exemplary asymmetric MIMO configurations comprise 2×4 ($n_t=2$, $n_r=4$) and 4×8 ($n_t=4$, $n_r=8$) supported for example in the LTE standard and the WiFi™ standard.

The transmitter 20 may convey a signal to a receiver 21 over a noisy wireless MIMO channel represented by a channel matrix $H_c$. The transmitter 20 may be implemented in different devices or systems capable of operating in wireless environments. Exemplary devices adapted for such applications comprise mobile phones, drones, laptops, tablets, robots, IoT (Internet of Things) devices, base stations, etc. The transmitter 20 may be fixed or mobile. It may comprise for example:
- a channel encoder 201 implementing one or more Forward Error Correction (FEC) codes such as linear block codes, convolutional codes, polar codes, Low Parity Check Codes (LDPC), etc;
- a modulator 203 implementing a modulation scheme such as Quadrature Amplitude Modulation (QAM) delivering a modulated symbol vector $s_c$;
- a Space-Time encoder 205 for delivering a codeword matrix X;
- $n_t$ transmit antennas 207, each transmit antenna being associated with a single-carrier or a multi-carrier modulator such as an OFDM or an FBMC modulator.

The transmitter 20 may be configured to encode a received flow of information bits as data input using a FEC encoder 201 implementing for example a linear block code, a convolutional code, a low-density parity-check (LDPC) code or a polar code. The encoded binary signal may be then modulated into a symbol vector $s_c$ using the modulator 203. Different modulation schemes may be implemented such as $2^q$-QAM or $2^q$-PSK with $2^q$ symbols or states. The modulated vector $s_c$ may be a complex-value vector comprising $\kappa$ complex-value symbols $s_1, s_2, \ldots, s_K$ with q bits per symbol.

An information symbol $s_j$ has a mean power $E_s$, and can be written in the form:

$$s_j = \Re(s_j) + i\Im(s_j) \quad (4)$$

In equation (4) i denotes the complex number such that $i^2=-1$ and the $\Re(\bullet)$ and $\Im(\bullet)$ operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A=[-(q-1), (q-1)]$. The minimum distance $d_{min}$ of a modulation scheme represents the Euclidean distance between two adjacent points in the constellation and is equal to 2 in such example.

A Space-Time Encoder 205 may be used to generate a codeword matrix X from the encoded symbols. The Space-Time Encoder 205 may use a linear STBC of length T and may deliver a codeword matrix X of dimension $n_t \times T$ that belongs to a codebook C and is sent over T time slots. The coding rate of such codes is equal to $$\frac{\kappa}{T}$$

complex symbols per channel use, where $\kappa$ is the number of encoded complex-value symbols composing the vector $s_c=[s_1, s_2, \ldots, s_\kappa]^t$ of dimension $\kappa$ in this case. When full-rate codes are used, the Space-Time Encoder 205 encodes $\kappa=n_t T$ complex-value symbols. Examples of STBCs are the Perfect Codes. The Perfect Codes provide full coding rates by encoding a number $\kappa=n_t^2$ ($T=n_t$) of complex information symbols and satisfy a non-vanishing determinant property.

In some embodiments, the Space-Time Encoder 205 may use a spatial multiplexing scheme known as V-BLAST scheme by multiplexing the received complex-value information symbols over the different transmit antennas, without performing a coding in the time dimension.

The codeword thus constructed may be converted from the time domain to the frequency domain using a multicarrier modulation technique, using for example OFDM or FBMC modulators, and spread over the transmit antennas 207. Signals may be sent from the transmit antennas 207 after optional filtering, frequency transposition and amplification.

The receiver 21 may be configured to receive and decode a signal communicated by the transmitter 20 in a wireless network through a transmission channel (also referred to as a "communication channel") subject to fading and interference and represented by a complex-value channel matrix $H_c$. In addition, the communication channel may be noisy, affected for example by a Gaussian Noise.

The receiver 21 may be integrated in a base station such as a Node-B in a cellular network, an access point in a local area network or ad-hoc networks or any other interfacing device operating in a wireless environment. The receiver 21 may be fixed or mobile. In one exemplary embodiment, the receiver 21 may comprise:
- a Space-Time decoder 211 (also referred to as 'a MIMO decoder') configured to deliver, from the channel matrix $H_c$ and the channel output signal $Y_c$, an estimation $\hat{s}_c$ of the modulated symbol vector $s_c$;
- a demodulator 213 configured to generate a binary sequence by performing a demodulation of the estimated symbol vector $\hat{s}_c$, and
- a channel decoder 215 configured to deliver, as an output, a binary signal which is an estimation of the transmitted bits, using for example the Viterbi algorithm.

The receiver 21 implements a reverse processing of the processing performed by the transmitter 20. Accordingly, if a single-carrier modulation is used at the transmitter rather than a multi-carrier modulation, then the $n_r$ OFDM of FBMC demodulators may be replaced by corresponding single-carrier demodulators.

Figure 3:
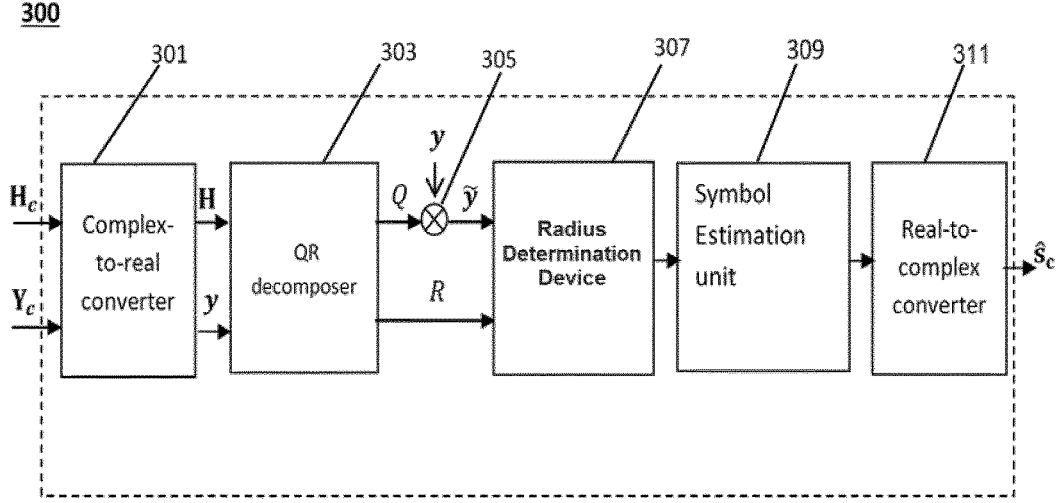
FIG. 3 is a block diagram illustrating a Space-Time decoder, according to some embodiments of the invention.

FIG. 3 represents a block structure of a Space-Time decoder 300 according to some embodiments in application to a wireless Rayleigh fading multiple antenna system, the decoder 300 being configured to receive and decode a signal sent from a transmitter equipped with $n_t$ transmit antennas, the decoder 300 being implemented in a receiver device equipped with $n_r$ receive antennas.

According to some embodiments in which Space-Time encoding has been performed at the transmitter using a Space-Time code of length T encoding $\kappa$ symbols, the received complex-value signal may be written in the form:

$$Y_c = H_c X_c + W_c \quad (5)$$

In equation (5), $Y_c$ designates a $n_r \times T$ matrix representing the received signal, $X_c$ denotes a complex-value codeword matrix of dimensions $n_t \times T$.

According to some embodiments in which V-BLAST spatial multiplexing is used, the received complex-value signal may be written in the form:

$$y_c = H_c s_c + w_c \qquad (6)$$

In equation (6), $y_c$ is a $n_r$-dimensional vector, $s_c$ denotes the complex-value vector of transmitted information symbols of dimension $n_t$.

The complex-value $n_r \times n_t$ matrix $H_c$ represents the channel matrix comprising the fading gains. In a Rayleigh fading channel, the entries of the channel matrix $H_c$ are of independent identically distributed (i.i.d) complex Gaussian-type. The channel matrix may be estimated in coherent transmissions at the receiver using estimation techniques such as least square estimators. In addition to the multipath fading effects, the transmission channel may be noisy. The noise may result from the thermal noise of the system components, inter-user interference and intercepted interfering radiation by antennas. The total noise may be modeled by a zero-mean Additive White Gaussian Noise of variance $\sigma^2$ per real-value dimension modeled respectively by the $n_r \times T$ complex-value matrix $W_c$ and the $n_r$-dimensional complex-value vector $w_c$.

The decoder may comprise a complex-to-real converter 301 configured to convert the complex-value channel matrix $H_c$ into a real-value equivalent channel matrix H, and convert the complex-value received signal into a real-value signal.

In one embodiment using a V-BLAST spatial multiplexing, the complex-to-real converter 301 may be configured to transform the complex-valued system into:

$$y = \begin{bmatrix} \Re(y_c) \\ \Im(y_c) \end{bmatrix} = \begin{bmatrix} \Re(H_c) & -\Im(H_c) \\ \Im(H_c) & \Re(H_c) \end{bmatrix} \begin{bmatrix} \Re(s_c) \\ \Im(s_c) \end{bmatrix} + \begin{bmatrix} \Re(w_c) \\ \Im(w_c) \end{bmatrix} \qquad (7)$$

The $\Re(\bullet)$ and $\Im(\bullet)$ operators designate the real and imaginary parts of each element composing the underlying vector or matrix. The complex-to-real conversion may be performed considering an arbitrary order of the elements of the vectors and is not limited to this exemplary conversion.

In another embodiments using linear Space-Time block coding at the transmitter, the complex-to-real converter 301 may be configured to transform the complex-valued system into a real-value system that can be written in a linear representation form where the equivalent channel matrix is the real-value $2n_r T \times 2\kappa$ matrix $H_{eq}$ given by:

$$H_{eq} = (I_T \otimes H)G \qquad (8)$$

The $2n_r T \times 2\kappa$ matrix G designates a real-value matrix known as a generator matrix or coding matrix of the linear Space-Time Block code used at the transmitter. $I_T$ denotes the identity matrix of dimension T and the operator $\otimes$ is the Kronecker matrices product.

To facilitate the understanding of the following embodiments, the following description will be made with reference to a spatial multiplexing scheme and involving a symmetric MIMO configuration where the transmitter and receiver are equipped with the same number of antennas $n_t = n_r$, for illustration purposes only. Accordingly, the real-value system can be written in the linear form as:

$$y = Hs + w \qquad (9)$$

In equation (9), the vectors y, s and w are n-dimensional vectors with $n = 2n_t = 2n_r$ and the equivalent real-value channel matrix H is a square $n \times n$ matrix. The vector s comprises the real and imaginary parts of the original complex-value information symbols comprised in the vector $s_c$. In embodiments where for example a $2^q$-QAM modulation is used, the components of the vector S belong to the same finite alphabet $A = [-(q-1), (q-1)]$.

Given the integer nature of the vector s, any signal in the form x=Hs can be considered as a point from the n-dimensional lattice $\Lambda_H$ of a generator matrix the real value channel matrix H. Accordingly, the real-valued MIMO system may be associated with a lattice representation. Each possible value of the vector s comprising the real and imaginary parts of the original complex-value information symbols may be represented by a lattice point in the lattice $\Lambda_H$. Moreover, due to the presence of the noise vector w, the real value received signal y does not correspond to a lattice point. It may be seen as a point of the lattice $\Lambda_H$ disturbed by the noise vector w.

Lattices are by definition infinite, i.e. comprise infinity of lattice points. When modulations such as QAM are used, the set of the possible values of the vector of symbols s is finite and is determined by the finite alphabet A. In this case, the associated lattice points to the possible values of the vector s constitute a finite number of points in the lattice $\Lambda_H$. Such lattice points will be referred to in the following description as 'valid lattice points'.

According to the ML decoding criterion, the optimal estimate $\hat{s}_{ML}$ of the vector s is the solution of the optimization problem given by:

$$\hat{s}_{ML} = \underset{s \in A^n}{\operatorname{argmin}} \|y - Hs\|^2 \qquad (10)$$

Using the lattice representation of the MIMO system, solving the ML decoding problem reduces to solve a closest vector problem in the lattice $\Lambda_H$. The ML solution corresponds in this case to the nearest valid lattice point to the received signal in the sense of the minimization of the Euclidean Distance.

For practical implementations, an equivalent tree representation of the MIMO system may be used based on QR decomposition. Accordingly, the decoder 300 may comprise a QR decomposer 303 configured to generate an orthogonal matrix $Q \in \mathbb{R}^{n \times n}$ and an upper triangular matrix $R \in \mathbb{R}^{n \times n}$ by applying a QR decomposition to the real-value channel matrix such that H=QR. The components of the upper triangular matrix are denoted by $R_{ij}$ with i, j=1, . . . , n.

The decoder 300 may further comprise a multiplication unit 305 configured to determine a received signal $\tilde{y}$ by scaling the real-value signal y by the transpose of the orthogonal matrix Q obtained from the QR decomposition of the real-value channel matrix such that:

$$\tilde{y} = Q^t y = R.s + \tilde{w} \quad (11)$$

In equation (11), $\tilde{w}=Q^t w$ designates a scaled noise vector having the same statistical properties (same covariance matrix) as the noise vector w, given that the matrix Q is orthogonal. An equivalent lattice representation may be accordingly defined by the lattice $\Lambda_R$ of a generator matrix the upper triangular matrix R. The ML decoding problem may be accordingly expressed as:

$$\hat{s}_{ML} = \underset{s \in A^n}{\operatorname{argmin}} \|\tilde{y} - Rs\|^2 \quad (12)$$

An ML metric may be defined by:

$$m(s) = \|\tilde{y} - Rs\|^2 \quad (13)$$

Furthermore, given the upper triangular structure of the matrix R, a tree representation may be associated with the MIMO system. The tree representation is defined by a decoding tree (hereinafter referred to as 'tree' or 'search tree'). A decoding tree is a graph data structure comprising a plurality of nodes, levels, branches and paths. More specifically, the decoding tree comprises n levels where each level comprises at most card(A) nodes, with card(A) designating the cardinality of the finite alphabet A.

Nodes in the tree correspond to the different possible values of the real and imaginary parts of the complex value information symbols comprised in the vector s.

Levels correspond to the ranks of the decoded symbols in the vector s in a reverse order such that nodes located in the first level of the tree correspond to the last component of the vector of symbols s, the second level to the penultimate, and so on. By writing the vector $s=(s_1, s_2, \ldots, s_n)^t$, a node located at a level k in the tree corresponds to a possible value of the symbol $s_{n-k+1}$. Nodes located in the last level of the tree are termed leaf nodes and correspond to the possible values of the first symbol $s_1$.

Branches depart from a virtual node termed 'root node' and link nodes located in two consecutive levels. The root node may be denoted as $s_{root}$ or $s_{n+1}$. A branch denoted as $(s_{i+1}, s_i)$ corresponds to a connection between two nodes $s_{i+1}$ and $s_i$ located in the consecutive levels n−i and n−i+1. A branch connecting the root node to a node $s_n$ located at the first level of the tree is by convention denoted as $(s_{n+1}, s_n)$.

Each branch is associated with a cost function (also referred to hereinafter as 'partial metric' or 'partial Euclidean Distance'). The cost function associated to a branch $(s_{i+1}, s_i)$ may be defined using the ML metric by:

$$m(s_{i+1}, s_i) = \left| \tilde{y}_i - \sum_{j=i}^{n} R_{ij} s_j \right|^2 \quad (14)$$

$\tilde{y}_i$ designates the $i^{th}$ component of the vector $\tilde{y}$ and $R_{ij}$ stands for the component of the upper triangular matrix R located in the $i^{th}$ row and $j^{th}$ column. The cost function associated with a branch $(s_{n+1}, s_n)$ starting at the root node is given by:

$$m(s_{n+1}, s_n) = |\tilde{y}_n - R_{nn} s_n|^2 \quad (15)$$

Each node in the tree may be associated with a metric. Using the definition of the partial metrics of branches, a metric associated with a given node in the tree may be seen as a summation of the partial metrics of the different branches constituting the path from the root node to this given node. Accordingly, a metric associated with a node $s_{n-k+1}$ located at the level k may be expressed as:

$$m_k(s_{n-k+1}) = \sum_{i=n}^{n-k+1} m(s_{i+1}, s_i) = \sum_{i=n}^{n-k+1} \left| \tilde{y}_i - \sum_{j=i}^{n} R_{ij} s_j \right|^2 \quad (16)$$

A path from the root node to a leaf node corresponds to a possible values $\hat{s}$ of the vector of symbols s. The associated metric to the leaf node corresponds to the Euclidean Distance between the equivalent received signal $\tilde{y}$ and the vector $x=R\hat{s}$ obtained using the vector $\hat{s}$.

According to the tree representation of the MIMO system, the ML optimization problem may be equivalently solved by performing a tree-search in the decoding tree. Accordingly, the ML solution corresponds to the path in the decoding tree resulting in the lowest metric.

The computational complexity of the tree-search is proportional to the number of visited nodes during the tree-search which depends on the number of nodes at each level and the total number of levels of the decoding tree.

In order to reduce the number of examined nodes and hence reduce the decoding complexity, the embodiments of the invention provide decoding methods and devices based on sphere search-based estimation algorithms that reduce the number of visited nodes during the tree search by imposing search intervals for each level of the decoding tree. Only nodes that belong to these search intervals are examined while exploring the path with the lowest metric. Using the equivalent lattice representation of the MIMO system, the reduction of the number of visited nodes may be equivalently seen as a reduction of the number of visited lattice points during the lattice points search to the lattice points that fall inside a spherical region ⬚ $_{r_s}$ of a search sphere radius $r_s$ centered at the point representing the real value received signal $\hat{y}$. The ML solution is accordingly determined by solving the optimization problem given by:

$$\hat{s}_{ML} = \underset{s \in A^n}{\operatorname{argmin}} \|\tilde{y} - Rs\|^2 \leq r_s^2 \quad (17)$$

Departing from search sphere radius $r_s$, sphere search-based estimation algorithms search for a first lattice point associated with one of the possible values of the vector of information symbols inside the spherical region ⬚ $_{r_s}$. Upon finding a valid lattice point, the value of the search sphere radius is updated to the value of the Euclidean distance between the lattice point found in the spherical region ⬚ $_{r_s}$ and the point representing the received signal $\tilde{y}$. This sphere-constrained search and the radius update are performed iteratively until finding the ML solution which corresponds to the smallest sphere that comprises a valid lattice point and that is centered at the point representing the received signal.

The complexity of the lattice points search phase depends critically on the choice of the search sphere radius $r_s$. The embodiments of the invention provide efficient devices and methods for determining search sphere radius $r_s$ that enables reducing the complexity of the tree-search phase without sacrificing optimal performance.

Accordingly, the decoder 300 may comprise a radius determination device 307 configured to determine a search sphere radius $r_s$ from a preliminary radius $r_0$ by applying a machine learning algorithm to input data that depend on the received signal $\tilde{y}$ and the channel matrix R.

According to some embodiments, the radius determination device 307 may be configured to determine the search sphere radius $r_s$ according to an iterative process by updating a current radius during a number of iterations $N_{iter}$ until a stopping condition (also referred to as 'a termination condition') is satisfied. The current radius corresponding to the $i^{th}$ iteration is designated by $r_s^{(i)}$, for i=1, ..., $N_{iter}$. Accordingly, at a first iteration for i=1, the radius determination device 307 may be configured to initially set a current radius to a preliminary radius $r_0$ such that $r_s^{(1)}=r_0$. After the initialization of the current radius, the radius determination device 307 may be configured to iteratively update the current radius during $N_{iter}$ iterations. Each $i^{th}$ iteration for i=1, ..., $N_{iter}$ comprise the steps that consist in:
  i. applying a machine learning algorithm to input data derived from the received signal $\tilde{y}$ the channel matrix R and a current radius $r_s^{(i)}$, which provides a current prediction $N_{pred}^{(i)}$ of number of lattice points (also referred to as 'a current predicted number of lattice points') associated with the current radius $r_s^{(i)}$;
  ii. comparing the current predicted number of lattice points $N_{pred}^{(i)}$ to a given threshold denoted by $N_{th}$;
  iii. updating the current radius $r_s^{(i)}$ if the current prediction $N_{pred}^{(i)}$ of number of lattice points is strictly higher than the given threshold, i.e. if $N_{pred}^{(i)} > N_{th}$, the radius determination device 307 being configured to update the current radius $r_s^{(i)}$ by applying a linear function $f(\bullet)$ to the current radius. Accordingly, the index of the iteration is first updated such that i=i+1, then the current sphere radius is updated such that $r_s^{(i)}=f(r_s^{(i-1)})$.

The termination condition is related to the current predicted number of lattice points. More specifically, the termination condition is satisfied if the current predicted number of lattice points $N_{pred}^{(i)}$ is smaller than or equal to the given threshold $N_{th}$. Once the stopping condition is satisfied, the radius determination device 307 may be configured to set the search sphere radius $r_s$ to the last updated current radius $r_s^{(N_{iter})}$ that is associated with the current predicted number of lattice points $N_{pred}^{(N_{iter})}$ that satisfies the stopping condition such that $N_{pred}^{(N_{iter})} \leq N_{th}$. This means that the radius determination radius 307 may be configured to set the search sphere radius to the current radius in response to the termination condition being satisfied.

According to some embodiments, the radius determination device 307 may be configured to update the current radius using a linear function that has a slope parameter equal to ½ and an intercept parameter equal to zero, which remains to divide the current radius by two, i.e. $r_s^{(i)}=r_s^{(i-1)}/2$.

At each iteration i=1, ..., $N_{iter}$, the radius determination device 307 may be configured to apply the machine learning algorithm to determine a predicted number of lattice points $N_{pred}^{(i)}$ that corresponds to a predicted number of lattice points that fall inside a spherical region centered at the received signal $\tilde{y}$ and having of a sphere radius the current radius $r_s^{(i)}$. The machine learning algorithm takes as input, at each iteration i=1, ..., $N_{iter}$, the input vector denoted by $x_0^{(i)}=(\tilde{y}, r_s^{(i)}, R)$ that comprises n components of the received signal $\tilde{y}$, the current radius $r_s^{(i)}$, and $n^2$ components in the upper triangular channel matrix R.

According to some embodiments, the radius determination device 307 may be configured to determine the preliminary radius $r_0$ from at least one parameter among a noise variance $\sigma_{noise}$, diagonal components of the channel matrix R, and the Euclidean distance representing the distance between the received signal $\tilde{y}$ and an estimate vector $y_{est}$, the estimate vector being determined by applying a suboptimal estimation algorithm, the suboptimal estimation algorithm being chosen in a group comprising a Zero-Forcing Decision Feedback Equalizer (ZF-DFE) and a Minimum Mean Square Error estimation (MMSE) algorithm.

According to some embodiments, the radius determination device 307 may be configured to determine the preliminary radius based on the variance of the channel additive noise according to:

$$r_0^2 = 2n\sigma_{noise}^2 \quad (18)$$

According to some embodiments, the radius determination device 307 may be configured to determine the preliminary radius depending on the diagonal components of the channel matrix R to take into account the dynamics of the transmission channel and changes on the signal fading according to:

$$r_0 = \min(\text{diag}(H^t H)) = \min(\text{diag}(R^t R)) \quad (19)$$

According to some embodiments in which the radius determination device 307 is configured to determine the preliminary radius as function of the variance of the channel noise according to $r_0^2=2n\sigma_{noise}^2$, the radius determination device 307 may be configured to determine the number of iterations $N_{iter}$ of the steps i to iii as a linear function of a signal to noise ratio expressed in decibels as $$\rho = 10\log10(SNR) = 10\log10\left(\frac{P_t}{2\sigma_{noise}^2}\right)$$

with $P_t$ designating a transmit power. More specifically, the radius determination device 307 may be configured to determine the linear function of the signal-to-noise ratio by exploiting a counting function that relates the given threshold $N_{th}$ to the determinant the lattice generator matrix R of the lattice $\Lambda_R$, the counting function being given by:

$$N_{th} = \frac{vol(B_{r_{ch}})}{\det(\Lambda_R)} = \frac{r_{ch}^n \pi^{\frac{n}{2}} \Gamma\left(\frac{n}{2}+1\right)^{-1}}{\det(\Lambda_R)} = \frac{r_{th}^n V_n}{\det(\Lambda_R)} \quad (20)$$

$r_{th}$ designates the radius of the sphere that contains a number of lattice points equal to the threshold $N_{th}$, $\det(\Lambda_R)$ designates the determinant of the generator matrix of the lattice $\Lambda_R$, and $V_n$ designates the volume of a unit radius sphere in the real vector space $\mathbb{R}^n$.

Using the counting function, the inventors determined that by successively dividing the preliminary radius $r_0^2=2n\sigma_{noise}^2$ by two during $N_{iter}$ iterations, the number of iterations $N_{iter}$ may be expressed as function of the signalto-noise ratio ρ according to a linear function $N_{iter}=a\rho+b$ defined by a slope coefficient denoted by a and an intercept coefficient denoted by b, the slope coefficient being given by the inverse of the product of minus ten and the logarithmic to the base ten of two according to:

$$a = \frac{-1}{10\log_{10}(2)} \quad (21)$$

The intercept coefficient b is dependent on the transmit power $P_t$, the given threshold $N_{th}$, and the determinant of the generator matrix R of the lattice $\Lambda_R$ according to:

$$b = \frac{2}{n\log_{10}(2)} \times (\log_{10}(V_n) - E(\log_{10}(\det(\Lambda_R))) - E(\log_{10}(N_{th}))) + \frac{1}{\log_{10}(2)}\left(\log_{10}(2n) + \log_{10}\left(\frac{P_t}{2}\right)\right) \quad (22)$$

By exploiting the linear function relating the number of iterations to the signal to noise ratio, the radius determination device 307 may be configured to set the search radius equal to $r_s^2 = r_0^2/2^{N_{iter}}$ without performing machine learning processing. This technique is referred to as 'smart sphere-based decoding' or SSD.

The decoder 300 may further comprise a symbol estimation unit 309 configured to determine at least one estimates of the vector of information symbols s by applying a sphere search-based estimation algorithm to solve the ML optimization problem, the at least one estimate of the vector of information symbols being determined from the lattice points found inside the spherical region ☐$_{r_s}$ of radius $r_s$ during the lattice points search phase.

According to some embodiments, the sphere search-based estimation algorithm may be chosen in a group comprising the sphere decoder and the SB-Stack decoder.

According to some embodiments in which the Sphere Decoder is considered, the symbol estimation unit 309 may be configured to define search intervals denoted $I_t=[b_{inf,t}, b_{sup,t}]$ for each decoded symbol $s_t$ in the vector of information symbols$=(s_1, s_2, \ldots, s_n)^t$, the lower boundary $b_{inf,t}$ and the upper boundary $b_{sup,t}$ of the search interval $I_t$ being determined as a function of the search sphere radius $r_s$. The sphere constraint can be found recursively by scanning the points in the spherical region ☐$_{r_s}$ of radius $r_s$ according to a branch and bound approach and selecting the valid lattice points that satisfy the shaping constraint expressed in the ML optimization problem. The sphere decoder is based on a depth-first tree search strategy. Each time a valid lattice point is found inside the sphere ☐$_{r_s}$, the search sphere radius may be updated by setting the search sphere radius to a new value equal to the Euclidean distance between the found lattice point and the received signal. When all the lattice points have been searched recursively, the found lattice points having the minimum Euclidean distance to the received signal from the found lattice points inside the spherical region may be selected to determine at least one estimate of the vector of information symbols.

According to other embodiments in which the SB-Stack is considered, a best-first tree-search may be used to explore the nodes in the decoding tree. Starting from the root node, all or a sub-set of the child nodes are explored and a partial metric is computed for each explored child node. Only nodes that have a partial metric that satisfy the sphere constraint and the search intervals are generated and stored in a stack. The search is continued until finding a leaf node and the optimal path corresponding to the ML solution is returned, without any update of the search sphere radius.

The decoder 300 may further comprise a real-to-complex converter 311 configured to deliver a complex-value vector as $\hat{s}_c$ an estimate of the original vector of complex-value symbols $s_c$. Then, the obtained candidate vector $\hat{s}$ may be converted into the complex-value vector $\hat{s}_c=[\hat{s}_1,\hat{s}_2\ldots,\hat{s}_{n/2}]^t$ such that a component $\hat{s}_j$ for $j=1, \ldots, n/2$ is given by:

$$\hat{s}_j = (\hat{s})_j + i(\hat{s})_{j+\frac{n}{2}} \quad (23)$$

$(u)_j$ denotes the $j^{th}$ element of a vector u.

According to some embodiments, the machine learning algorithm may be a supervised machine learning algorithm that maps input data to predicted data using a function that is determined based on labeled training data that consists of a set of labeled input-output pairs. Exemplary supervised machine learning algorithms comprise, without limitation, Support Vector Machines (SVM), linear regression, logistic regression, naive Bayes, linear discriminant analysis, decision trees, k-nearest neighbor algorithm, neural networks, and similarity learning.

In preferred embodiments, the supervised machine learning algorithm may be a multilayer perceptron that is a multilayer feed-forward artificial neural network.

Figure 4:
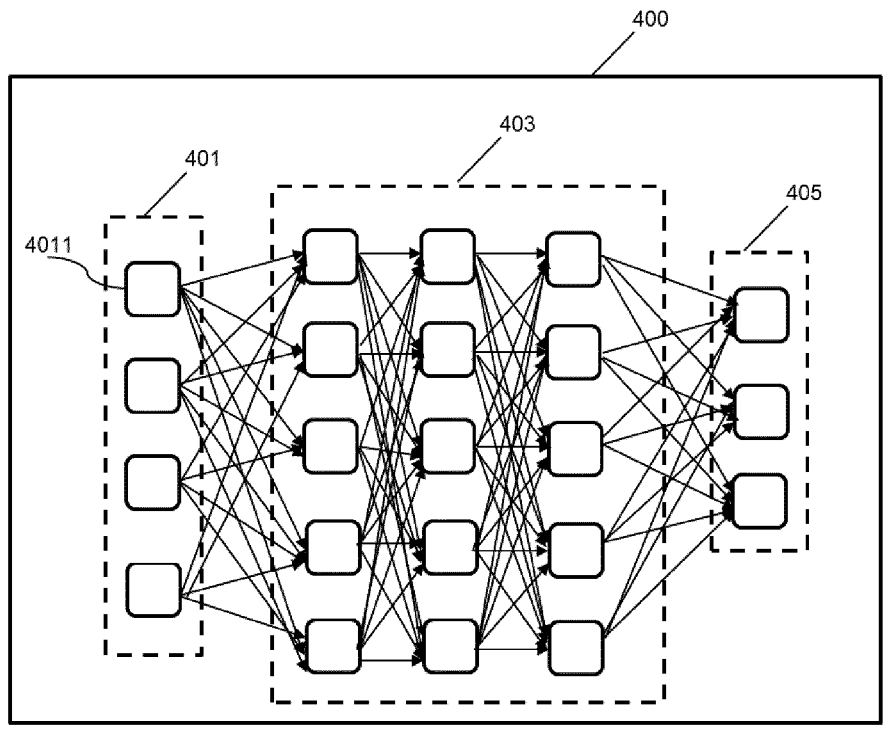
FIG. 4 illustrates a schematic diagram of a machine learning algorithm, according to some embodiments of the invention using deep neural networks.

Referring to FIG. 4, a multilayer deep neural network $D(K, \theta_{k=1, \ldots, K}, \sigma)$ 400 made up of an input layer and at least two layers (K≥2) that comprise one or more hidden layers 403, and an output layer 405, is illustrated. Each layer among the input layer 401, the one or more hidden layers 403, and the output layer 405 comprises a plurality of artificial neurons or computation nodes 4011.

The multilayer deep neural network 400 is fully connected. Accordingly, each computation node in one layer connects with a certain weight to every computation node in the following layer, i.e. combines input from the connected nodes from a previous layer with a set of weights that either amplify or dampen the input values. Each layer's output is simultaneously the subsequent layer's input, starting from the input layer 401 that is configured to receive input data.

Except of the input computation nodes, i.e. the computation nodes 4011 in the input layer, each computation node 4011 comprised in the one or more hidden layers implements a non-linear activation function σ that maps the weighted inputs of the computation node to the output of the computation node.

According to the multilayer structure, the deep neural network defines a mapping $f(x_0^{(i)};\theta): \mathbb{R}^{N^{(0)}} \mapsto \mathbb{R}^{N^{(K)}}$ that maps, at each iteration $i=1, \ldots, N_{iter}$, the input vector $x_0^{(i)} \in \mathbb{R}^{N^{(0)}}$ to an output vector denoted $x_K^{(i)} \in \mathbb{R}^{N^{(K)}}$ through K iterative machine learning processing steps, the $k^{th}$ layer among the K layers of the deep neural network carrying a mapping denoted by $f_k(x_{k-1}^{(i)};\theta_k): \mathbb{R}^{N^{(k-1)}} \mapsto \mathbb{R}^{N^{(k)}}$ that maps the input vector $x_{k-1}^{(i)} \in \mathbb{R}^{N^{(k-1)}}$ received as input by the $k^{th}$ layer, to the output vector $x_k^{(i)} \in \mathbb{R}^{N^{(k)}}$. The mapping at the $k^{th}$ layer depends on the input vector $x_{k-1}^{(i)}$, which corresponds to the output vector of the previous layer, and the set of parameters $\theta_k = \{W^{(k)} \in \mathbb{R}^{N^{(k)} \times N^{(k-1)}}; b^{(k)} \in \mathbb{R}^{N^{(k)}}\}$ associated with the $k^{th}$ layer. The mapping $f_k(x_{k-1}^{(i)}; \theta_k)$ associated with the $k^{th}$ layer (except the input layer) can be expressed as:

$$f_k(x_{k-1}^{(i)}; \theta_k) = \sigma(W^{(k)} x_{k-1}^{(i)} + b^{(k)}) \qquad (24)$$

The input-weight products performed at the computation nodes of the $k^{th}$ layer are represented by the product function $W^{(k)} x_{k-1}^{(i)}$ between the weight matrix $W^{(k)}$ and the input vector $x_{k-1}^{(i)}$ processed as input by the $k^{th}$ layer, these input-weight products are then summed and the sum is passed through the activation function $\sigma$.

According to some embodiments, the activation function may be implemented in at least one computation node 4011 among the plurality of computation nodes of the one or more hidden layers 403.

According to some embodiments, the activation function may be implemented at each node of the hidden layers.

According to some embodiments, the activation function may be chosen in a group comprising a linear activation function, a sigmoid function, the Tanh, the softmax function, a rectified linear unit (ReLU) function, and the CUBE function.

The linear activation function is the identity function in which the signal does not change.

The sigmoid function converts independent variables of almost infinite range into simple probabilities between '0' and '1'. It is a non-linear function that takes a value as input and outputs another value between '0' and '1'.

The tanh function represents the relationship between the hyperbolic sine and the hyperbolic cosine tan h(x)=sin h(x)/cos h(x).

The softmax activation generalizes the logistic regression and returns the probability distribution over mutually exclusive output classes. The softmax activation function may be implemented in the output layer of the deep neural network.

The ReLU activation function activates a neuron if the input of the neuron is above a given threshold. In particular, the given threshold may be equal to zero ('0'), in which case the ReLU activation function outputs a zero value if the input variable is a negative value and outputs the input variable according to the identity function if the input variable is a positive value. Mathematically, the ReLU function may be expressed as $\sigma(x) = \max(0, x)$.

According to some embodiments, the radius determination device 307 may be configured to previously determine and update the model parameters of the multilayer deep neural network during a training phase from training data. The radius determination device 307 may be configured to perform the training phase offline before implementing the $N_{iter}$ iteration performed to determine the search sphere radius $r_s$. Once, determined, the model parameters are then used at each iteration $i=1, \ldots, N_{iter}$ performed to update the current radius until a stopping condition is reached. The training phase (also referred to as 'a learning phase') is a global optimization problem performed to adjust the model parameters $\theta_{k=1, \ldots, K}$ in a way that enables minimizing a prediction error that quantifies how close the multilayer deep neural network is to the ideal model parameters that provide the best prediction. The model parameters may be initially set to initial parameters that may be, for example, randomly generated. The initial parameters are then updated during the training phase and adjusted in a way that enables the neural network to converge to the best predictions.

According to some embodiments, the multilayer deep neural network may be trained using back-propagation supervised learning techniques and uses training data to predict unobserved data.

The back-propagation technique is an iterative process of forward and backward propagations of information by the different layers of the multilayer deep neural network.

During the forward propagation phase, the neural network receives training data that comprises training input values and expected values (also referred to as 'labels') associated with the training input values, the expected values corresponding to the expected output of the neural network when the training input values are used as input. The expected values are known by the radius determination device 307 in application of supervised machine learning techniques. The neural network passes the training data across the entire multilayer neural network to determine estimated values (also referred to as 'intermediate values') that correspond to the predictions obtained for the training input values. The training data are passed in a way that all the computation nodes comprised in the different layers of the multilayer deep neural network apply their transformations or computations to the input values they receive from the computation nodes of the previous layers and send their output values to the computation nodes of the following layer. When data has crossed all the layers and all the computation nodes have made their computations, the output layer delivers the estimated values corresponding to the training data.

The last step of the forward propagation phase consists in comparing the expected values associated with the training data with the estimated values obtained when the training data was passed through the neural network as input. The comparison enables measuring how good/bad the estimated values were in relation to the expected values and to update the model parameters with the purpose of approaching the estimated values to the expected values such that the prediction error (also referred to 'estimation error' or 'cost') is near to zero. The prediction error may be estimated using a loss function based on a gradient procedure that updates the model parameters in the direction of the gradient of an objective function.

The forward propagation phase is followed with a backward propagation phase during which the model parameters, for instance the weights of the interconnections of the computation nodes 4011, are gradually adjusted in reverse order by applying an optimization algorithm until good predictions are obtained and the loss function is minimized.

First, the computed prediction error is propagated backward starting from the output layer to all the computation nodes 4011 of the one or more hidden layers 403 that contribute directly to the computation of the estimated values. Each computation node receives a fraction of the total prediction error based on its relative contribution to the output of the deep neural network. The process is repeated, layer by layer, until all the computation nodes in the deep neural network have received a prediction error that corresponds to their relative contribution to the total prediction error. Once the prediction error is spread backward, the layer parameters, for instance the first layer parameters (i.e. the weights) and the second layer parameters (i.e. the biases), may be updated by applying an optimization algorithm in accordance to the minimization of the loss function.

According to some embodiments, the radius determination device 307 may be configured to update the model parameters during the training phase according to a 'batch gradient descent approach' by computing the loss function and updating the model parameters for the entire training data.

According to some embodiments, the radius determination device 307 may be configured to update the model parameters during the training phase according to online learning by adjusting the model parameters for each sample of the training data. Using online learning, the loss function is evaluated for each sample of the training data. Online learning is also referred to as 'online training' and 'stochastic gradient descent'.

According to other embodiments, the radius determination device 307 may be configured to update the model parameters during the training phase from training data according to mini-batch learning (also referred to as 'mini-batch gradient descent') using mini-batches of data, a mini-batch of data of size $s_b$ is a subset of $s_b$ training samples. Accordingly, the radius determination device 307 may be configured to partition the training data into two or more batches of data of size $s_b$, each batch comprising $s_b$ samples of input data. The input data is then passed through the network in batches. The loss function is evaluated for each mini-batch of data passed through the neural network and the model parameters are updated for each mini-batch of data. The forward propagation and backward propagation phases are accordingly performed for each mini-batch of data until the last batch.

According to some embodiments, the radius determination device 307 may be configured to pass all the training data through the deep neural network 400 in the training process a plurality of times, referred to as epochs. The number of epochs may be increased until an accuracy metric evaluating the accuracy of the training data starts to decrease or continues to increase (for example when a potential overfitting is detected).

The received training data denoted $x^*=(\tilde{y}^*, r_s^*, R^*)$ may comprise $Nb_s$ training samples denoted $S=\{x^{*,1}, \ldots, x^{*,Nb_s}\}$ that comprise independent training samples dependent on the components of a training received signal $\tilde{y}^*$, the components of a training upper triangular matrix $R^*$, and a training sphere radius value $r_s^*$.

Based on supervised learning, the training samples may be labeled, i.e. associated with known expected output values (also referred to as 'targets' or 'labels') that correspond to the output of the deep neural network when the training samples are used as inputs of the deep neural network. More specifically, each sample $x^{*,m}$ for $m=1, \ldots, Nb_s$ may be associated with an expected value $N_{exp}^{*,m}$ of number of lattice points that fall inside the spherical region of radius $r_s^*$.

According to some embodiments in which mini-batch learning is used, the radius determination device 307 may be configured to determine (update or adjust) the model parameters during a training phase in mini-batches extracted from the received training data. In such embodiments, the radius determination unit 307 may be configured to partition the received training data into a plurality NB of sets of training data denoted $x^{(*,1)}, x^{(*,2)}, \ldots, x^{(*,NB)}$, a set of training data being a mini-batch of size $s_b$ comprising a set of $s_b$ training examples from the training data, i.e. each mini-batch $x^{(*,l)}$ comprises $s_b$ samples $x^{*,m}$ with m varying between 1 and $Nb_s$. A mini-batch $x^{(*,l)}$ is also designated by $S_l$ with training samples extracted from the $Nb_s$ training samples, that is $S_l \subset S$.

Each mini-batch $x^{(*,l)}$ for $l=1, \ldots, NB$ may be associated with a target value that corresponds to an expected number $N_{exp}^{(*,l)}$ of lattice points that is expected to be obtained by the deep neural network when the mini-batch of data $x^{(*,l)}$ is used as input of the deep neural network. The sets of training data and the target values may be grouped into vector pairs such that each vector pair denoted $(x^{(*,l)}, N_{exp}^{(*,l)})$ corresponds to the training examples and target values of the $l^{th}$ mini-batch.

Given the training data and the expected output values, the radius determination device 307 may be configured to perform the forward propagation and backward propagation phases of the training process.

Based on mini-batch training, the training phase may comprise two or more processing iterations. At each processing iteration, the radius determination device 307 may be configured to:

process the deep neural network using a mini-batch $x^{(*,l)}$ among the plurality of training sets as input, which provides an intermediate number of lattice points denoted $N_{est}^{(*,l)}$ associated with the mini-batch $x^{(*,l)}$. The intermediate number of lattice points $N_{est}^{(*,l)}$ is predicted at the output layer of the multilayer deep neural network;

compute a loss function denoted $L(N_{exp}^{(*,l)}, N_{est}^{(*,l)})$ for the processed mini-batch $x^{(*,l)}$ from the expected number $N_{exp}^{(*,l)}$ of lattice points associated with the mini-batch $x^{(*,l)}$ and the intermediate number of lattice points $N_{est}^{(*,l)}$ determined by processing the mini-batch of data $x^{(*,l)}$;

determine updated model parameters after processing the mini-batch $x^{(*,l)}$ according to the minimization of the loss function $L(N_{exp}^{(*,l)}, N_{est}^{(*,l)})$ by applying an optimization algorithm. More specifically, the radius determination unit 307 may be configured to determine updated first layer parameters $W^{(k)} \in \mathbb{R}^{N^{(k)} \times N^{(k-1)}}$ and updated second layer parameters $b^{(k)} \in \mathbb{R}^{N^{(k)}}$ associated with each of the K layers of the multilayer deep neural network $D(K, \theta_{k=1, \ldots, K}, \sigma)$, the first layer parameters and the second layer parameters corresponding respectively to the weights associated with the connections between the neurons of the deep neural network and the bias values.

For the first processing iteration, the radius determination device 307 may be configured to determine initial model parameters that will be used during the forward propagation phase of the first processing iteration of the training process. More specifically, the radius determination unit 307 may be configured to determine initial first layer parameters $W^{(k,init)} \in \mathbb{R}^{N^{(k)} \times N^{(k-1)}}$ and inital second layer parameters $b^{(k,init)} \in \mathbb{R}^{N^{(k)}}$ associated with each of the K layers of the multilayer deep neural network $D(K, \theta_{k=1, \ldots, K}, \sigma)$.

According to some embodiments, the radius determination device 307 may be configured to determine initial first layer parameters and initial second layer parameters associated with the different layers of the deep neural network randomly from a random set of values, for example following a standard normal distribution.

According to some embodiments, the optimization algorithm used to adjust the model parameters and determine updated model parameters may be chosen in a group comprising the Adadelta optimization algorithm, the Adagrad optimization algorithm, the adaptive moment estimation algorithm (ADAM) that computes adaptive learning rates for each model parameter, the Nesterov accelerated gradient (NAG) algorithm, the Nesterov-accelerated adaptive moment estimation (Nadam) algorithm, the RMSprop algorithm, stochastic gradient optimization algorithms, and adaptive learning rate optimization algorithms.

According to some embodiments, the loss function considered to evaluate the prediction error or loss may be chosen in a group comprising a mean square error function (MSE) that is used for linear regression, and the exponential log likelihood (EXPLL) function used for Poisson regression.

According to some embodiments in which the mean square error function is used, the loss function computed for the $l^{th}$ mini-batch of data may be expressed as:

$$L(N_{exp}^{(*,l)}, N_{est}^{(*,l)}) = \frac{1}{S_p} \sum_{m \in S_l} (N_{exp}^{*,m} - N_{est}^{*,m})^2 \qquad (25)$$

According to some embodiments, the radius determination device 307 may be configured to previously determine the expected numbers of lattice points $N_{exp}^{(*,l)}$ associated with each mini-batch $S_l$ for l=1, . . . , NB from a sphere radius r and the channel matrix R by applying a list sphere decoding algorithm (LSD) or a list spherical-bound stack decoding algorithm. The LSD and the list spherical-bound stack decoding algorithms are sphere-based decoding algorithms that solve the closest vector problem. They output a list of the codewords that lie inside a given bounded region of a given radius. More details on the LSD implementations are disclosed in "M. El-Khamy et al., Reduced Complexity List Sphere Decoding for MIMO Systems, Digital Signal Processing, Vol. 25, Pages 84-92, 2014".

Figure 5:
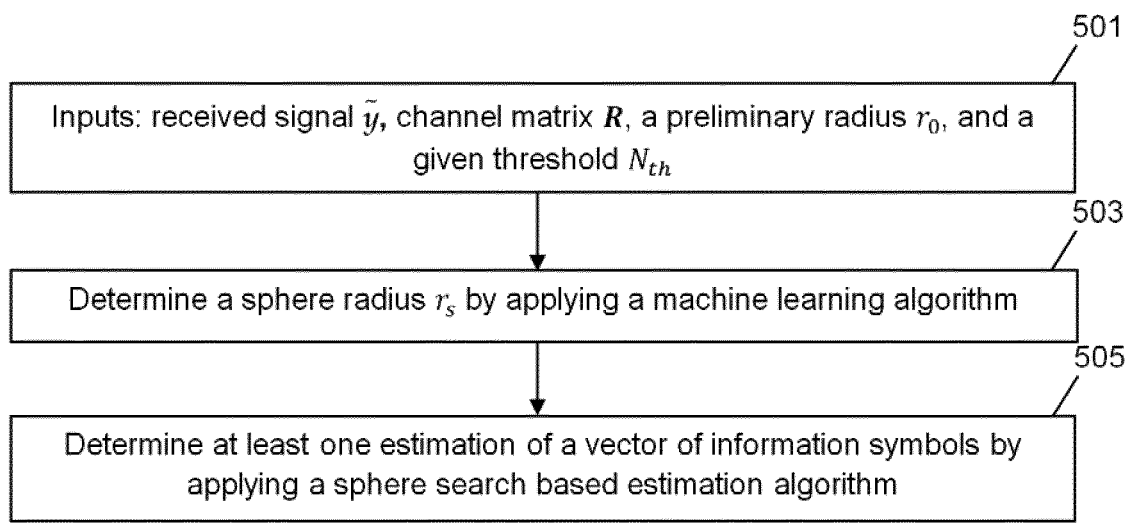
FIG. 5 is a flowchart illustrating a decoding method, according to some embodiments of the invention.

Referring to FIG. 5, there is also provided a decoding method for decoding a signal received through a transmission channel in a communication system, the signal comprising a vector of information symbols $s=(s_1, s_2, \ldots, s_n)^t$ and the transmission channel being represented by a channel matrix R.

At step 501, inputs comprising a received signal $\tilde{y}$, the channel matrix R, a preliminary radius $r_0$, and a given threshold $N_{th}$ may be received.

At step 503, a search sphere radius $r_s$ may be determined by applying a machine learning algorithm to input data that depend on the received signal $\tilde{y}$ and the channel matrix R.

At step 505, at least one estimates $\hat{s}$ of the vector of information symbols s may be determined by applying a sphere search-based estimation algorithm to solve the ML optimization problem, the at least one estimate of the vector of information symbols being determined from the lattice points found inside the spherical region $\mathcal{S}_{r_s}$ of radius $r_s$ during the lattice points search phase.

According to some embodiments, the sphere search-based estimation algorithm may be chosen in a group comprising the sphere decoder and the SB-Stack decoder.

According to some embodiments, step 501 may comprise previously determining the preliminary radius $r_0$ depending on one or more of a noise variance $\sigma_{noise}$, diagonal components of the channel matrix R, and the Euclidean distance measuring the distance between the received signal $\tilde{y}$ and an estimate vector $y_{est}$ determined by applying a suboptimal estimation algorithm, the suboptimal estimation algorithm being chosen in a group comprising a Zero-Forcing Decision Feedback Equalizer (ZF-DFE) and a Minimum Mean Square Error estimation (MMSE) algorithm.

Figure 6:
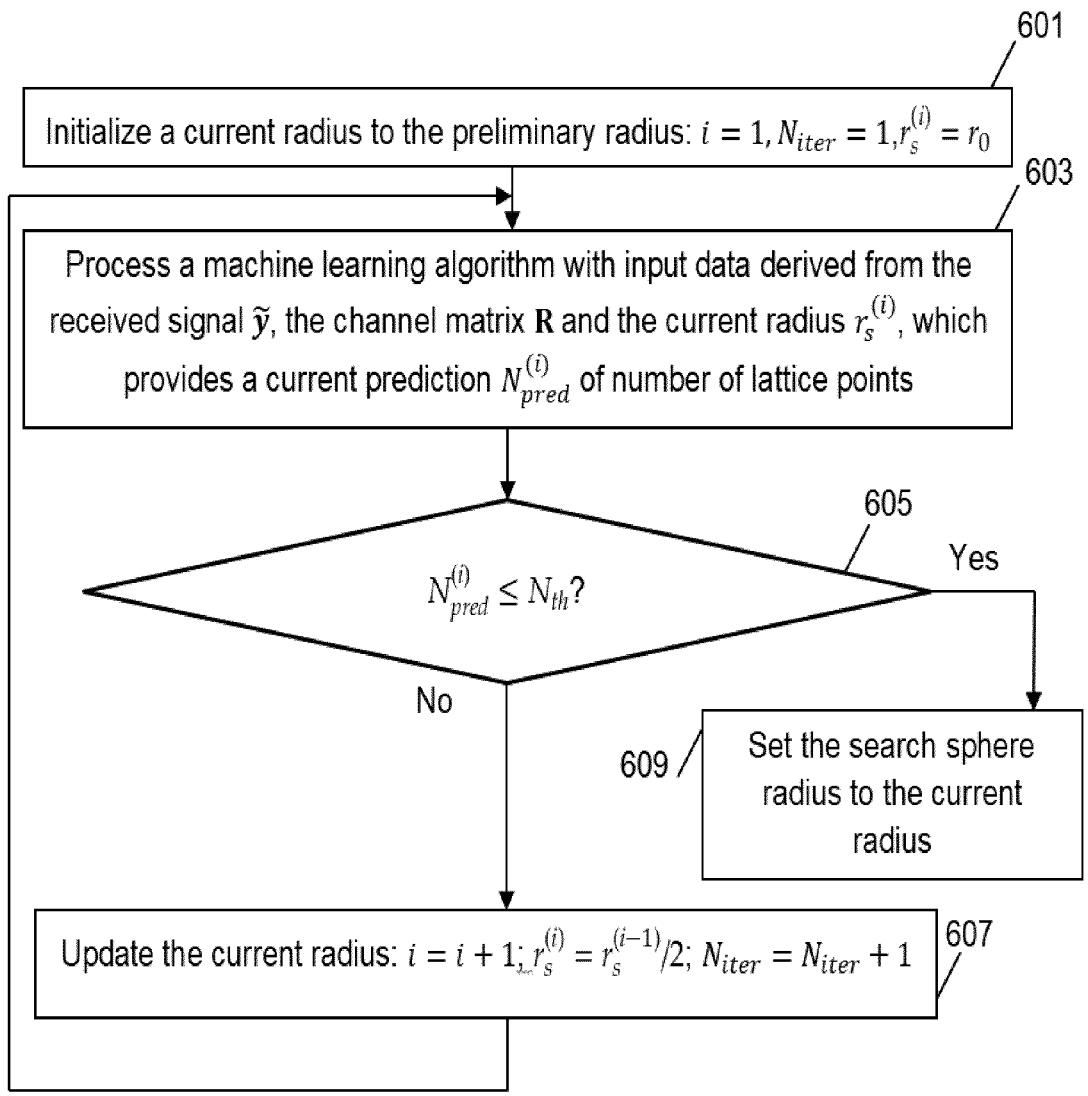
FIG. 6 is a flowchart illustrating a radius determination method, according to some embodiments of the invention.

FIG. 6 is a flowchart illustrating a method performed at step 502 for determining the search sphere radius $r_s$, according to some embodiments in which an iterative process is performed during a number of iterations $N_{iter}$ to update a current radius. The method comprises determining the search sphere radius $r_s$ from a preliminary radius. More specifically, the method comprises:

i. applying a machine learning algorithm to input data derived from the received signal, the channel matrix and a current radius, the current radius being initially set to the preliminary radius, which provides a current predicted number of lattice points associated with the current radius;

ii. comparing the current predicted number of lattice points to a given threshold;

iii. updating the current radius if the current predicted number of lattice points is strictly higher than the given threshold, the current radius being updated by applying a linear function $f(\bullet)$ to the current radius.

Steps i to iii may be iterated until a termination condition is satisfied, the termination condition being related to the current predicted number. The method comprises setting the search sphere radius to the current radius in response to the termination condition being satisfied.

More specifically, at step 601, the index of the iterations of the iterative process may be initialized to i=1 and a current radius may be initially set to the preliminary radius $r_s^{(1)}=r_0$.

Steps 603 to 607 may be repeated during a number of iterations $N_{iter}$ until a stopping condition (also referred to as a 'termination condition') is satisfied.

At step 603, a machine learning algorithm may be applied to input data derived from the received signal $\tilde{y}$, the channel matrix R and the current radius $r_s^{(i)}$, which provides a current predicted $N_{pred}^{(i)}$ of number of lattice points (also referred to as 'a current predicted number of lattice points') associated with the current radius $r_s^{(i)}$. The current predicted number of lattice points $N_{pred}^{(i)}$ corresponds to a predicted number of lattice points that fall inside a spherical region centered at the received signal $\tilde{y}$ and having of a sphere radius the current radius $r_s^{(i)}$. The machine learning algorithm takes as input the input vector $x_0^{(i)}=(\tilde{y}, r_s^{(i)}, R)$ that comprises n components of the received signal $\tilde{y}$, the current radius $r_s^{(i)}$, and $n^2$ components in the upper triangular channel matrix R.

At step 605, the current predicted number of lattice points $N_{pred}^{(i)}$ may be compared to the given threshold $N_{th}$.

If it is determined at step 605 that the current predicted number of lattice points $N_{pred}^{(i)}$ is smaller than or equal to the given threshold $N_{th}$, the search sphere radius $r_s$ may be set at step 609 to the last updated current radius $r_s^{(i)}=r_s^{(N_{iter})}$ that is associated with the current predicted number $N_{pred}^{(N_{iter})}$ of lattice points that satisfies the stopping condition of step 605.

If it is determined at step 605 that the current prediction $N_{pred}^{(i)}$ of number of lattice points is strictly higher than the given threshold, i.e. if $N_{pred}^{(i)} > N_{th}$, the current radius may be updated at step 607. Accordingly, the index of the iteration may be incremented such that i=i+1, the current radius may be updated by applying a linear function $f(\bullet)$ to the current radius and the number of performed iterations may be incremented by one such that $N_{iter}=N_{iter}+1$.

According to some embodiments, the linear function may have a slope parameter equal to ½ and an intercept parameter equal to zero, which corresponds to updating the current radius by dividing the current radius by two such that $r_s^{(i)}=r_s^{(i-1)}/2$.

According to some embodiments, the machine learning algorithm may be a supervised machine learning algorithm chosen in a group, comprising without limitation, Support Vector Machines, linear regression, logistic regression, naive Bayes, linear discriminant analysis, decision trees, k-nearest neighbor algorithm, neural networks, and similarity learning.

In preferred embodiments, the supervised machine learning algorithm may be a multilayer perceptron that is a multilayer feed-forward artificial neural network $D(K, \theta_{k=1,\ldots,K}, \sigma)$ made up of an input layer and at least two layers ($K \geq 2$) comprising one or more hidden layers and an output layer and associated with model parameters $\theta_{k=1,\ldots,K}$ and an activation function $\sigma$, the model parameters $\theta_{k=1,\ldots,K}$ comprising sets of layer parameters $\theta_k = \{W^{(k)} \in \mathbb{R}^{N^{(k)} \times N^{(k-1)}}; b^{(k)} \in \mathbb{R}^{N^{(k)}}\}$, each set of layer parameters comprising a first layer parameter $W^{(k)}$, and a second layer parameter $b^{(k)}$.

According to some embodiments, the activation function may be chosen in a group comprising a linear activation function, a sigmoid function, the Tanh, the softmax function, a rectified linear unit function, and the CUBE function.

According to some embodiments in which the machine learning algorithm is a multilayer deep neural network, step 603 may comprise a sub-step that is performed to determine updated model parameters according to a back-propagation supervised training or learning process that uses training data to train the multilayer deep neural network before processing the neural network for the determination of current radius during the decoding process.

According to some embodiments, the model parameters may be updated during the training process according to a 'batch gradient descent approach' by computing a loss function and updating the model parameters for the entire training data.

According to some embodiments, the model parameters may be updated during the training process according to online learning by adjusting the model parameters for each sample of the training data and computing a loss for each sample of the training data.

According to other embodiments, the model parameters may be updated during the training process from training data according to mini-batch learning using mini-batches of data, a mini-batch of data of size $s_b$ is a subset of $s_b$ training samples. Accordingly, the training data may be partitioned into two or more mini-batches of data of size $s_b$, each batch comprising $s_b$ samples of the input data. The input data is then passed through the network in mini-batches. A loss function is evaluated for each mini-batch of data and the model parameters are updated for each mini-batch of data.

Figure 7:
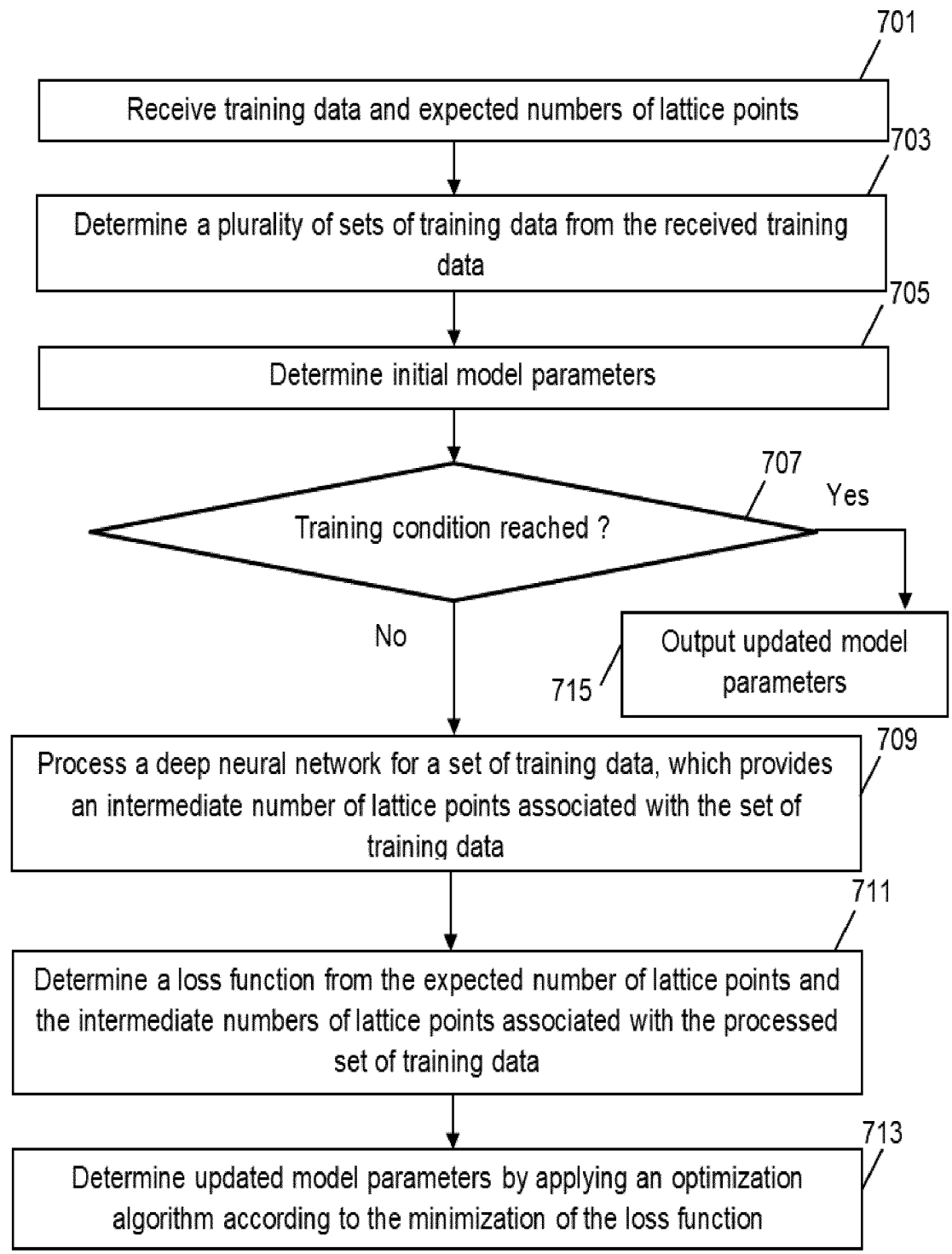
FIG. 7 is a flowchart illustrating a method for training a deep neural network, according to some embodiments of the invention.

FIG. 7 is a flowchart depicting a method for training the multilayer deep neural network $D(K, \theta_{k=1,\ldots,K}, \sigma)$ in order to determine the model parameters $\theta_{k=1,\ldots,K}$ that provide the best prediction in terms of the minimization of the prediction error according to some embodiments using mini-batch learning.

At step 701, training data $x^* = (\tilde{y}^*, r_s^*, R^*)$ comprising $Nb_s$ training samples $S = \{x^{*,1}, \ldots, x^{*,Nb_s}\}$ and expected numbers of lattice points $N_{exp}^{*,1}, \ldots, N_{exp}^{*,Nb_s}$ may be received, each sample $x^{*,m}$ for $m = 1, \ldots, Nb_s$ being associated with an expected value $N_{exp}^{*,m}$ of number of lattice points that fall inside the spherical region of radius $r_s^*$.

At step 703, training data may be partitioned into a plurality NB of sets of training data $x^{(*,1)}, x^{(*,2)}, \ldots, x^{(*,NB)}$. Each mini-batch $x^{(*,l)}$ $l = 1, \ldots, NB$ may be associated with a target value that corresponds to an expected number $N_{exp}^{(*,l)}$ of lattice points that is expected to be obtained by the deep neural network when the mini-batch of data $x^{(*,l)}$ is used as input of the deep neural network.

The training process may comprise two or more processing iterations that are repeated until a training condition is reached. The training condition may be related to the number of processed mini-batches of training data and/or to goodness of the updated model parameters with respect to the minimization of the prediction errors resulting from the updated model parameters.

At step 705, a first processing iteration may be performed during which initial model parameters may be determined to be used to process the first mini-batch of data. More specifically, initial first layer parameters $W^{(k,init)} \in \mathbb{R}^{N^{(k)} \times N^{(k-1)}}$ and initial second layer parameters $b^{(k,init)} \in \mathbb{R}^{N^{(k)}}$ associated with each of the K layers of the multilayer deep neural network $D(K, \theta_{k=1,\ldots,K}, \sigma)$ may be determined at step 705.

According to some embodiments, the initial first layer parameters and the initial second layer parameters associated with the different layers of the deep neural network may be determined randomly from a random set of values, for example following a standard normal distribution.

Steps 707 to 713 may be repeated for processing the mini-batches of data until the stopping condition is reached. A processing iteration of the training process consists of the steps 709 to 713 and relates to the processing of a mini-batch $x^{(*,l)}$ among the plurality of training sets $x^{(*,l)}$ for $l = 1, \ldots, NB$.

At step 709, the multilayer deep neural network may be processed using a mini-batch $x^{(*,l)}$ among the plurality of training sets as input, which provides an intermediate number of lattice points denoted $N_{est}^{(*,l)}$ associated with the mini-batch $x^{(*,l)}$. The intermediate number of lattice points $N_{est}^{(*,l)}$ is predicted at the output layer of the multilayer deep neural network.

At step 711, a loss function $L(N_{exp}^{(*,l)}, N_{est}^{(*,l)})$ may be computed for the processed mini-batch $x^{(*,l)}$ from the known expected number $N_{exp}^{(*,l)}$ of lattice points associated with the mini-batch $x^{(*,l)}$ and the intermediate number of lattice points $N_{est}^{(*,l)}$ determined by processing the mini-batch of data $x^{(*,l)}$ at step 709.

At step 713, updated model parameters may be determined after processing the mini-batch $x^{(*,l)}$ according to the minimization of the loss function $L(N_{exp}^{(*,l)}, N_{est}^{(*,l)})$ by applying an optimization algorithm. More specifically, the first layer parameters $W^{(k)} \in \mathbb{R}^{N^{(k)} \times N^{(k-1)}}$ and the second layer parameters $b^{(k)} \in \mathbb{R}^{N^{(k)}}$ associated with each of the K layers of the multilayer deep neural network $D(K, \theta_{k=1,\ldots,K}, \sigma)$ may be updated at step 713, the first layer parameters and the second layer parameters corresponding respectively to the weights associated with the connections between the neurons of the deep neural network and the bias values.

According to some embodiments, the optimization algorithm may be chosen in a group comprising the Adadelta optimization algorithm, the Adagrad optimization algorithm, the adaptive moment estimation algorithm, the Nesterov accelerated gradient algorithm, the Nesterov-accelerated adaptive moment estimation algorithm, the RMSprop algorithm, stochastic gradient optimization algorithms, and adaptive learning rate optimization algorithms.

According to some embodiments, the loss function may be chosen in a group comprising a mean square error function and the exponential log likelihood function.

According to some embodiments, step 701 may comprise determining expected number of lattice points $N_{exp}^{(*,l)}$ associated with each mini-batch $S_l$ for $l = 1, \ldots, NB$ from a sphere radius $r$ and the channel matrix $R$ by applying a list sphere decoding algorithm or a list spherical-bound stack decoding algorithm.

There is also provided a computer program product for determining a search sphere radius in a decoder configured to decode a signal received through a transmission channel, the signal comprising a vector of information symbols $s=(s_1, s_2, \ldots, s_n)^t$ and the transmission channel being represented by a channel matrix R. The computer program product comprises a non-transitory computer readable storage medium that, when executed by a processor, cause the processor to determine the search sphere radius $r_s$ by iteratively updating a current radius until a termination condition is satisfied. The processor is caused to initially set a current radius $r_s^{(i)}$ to a preliminary radius $r_0$ such that $r_s^{(1)}=r_0$ and to iteratively update the current radius $r_s^{(i)}$ during a number of iterations $N_{iter}$. Each $i^{th}$ iteration for $i=1, \ldots, N_{iter}$ comprising the steps consisting in:

processing a machine learning algorithm using input data derived from the received signal $\tilde{y}$, the channel matrix R and the current radius $r_s^{(i)}$, which provides a current prediction $N_{pred}^{(i)}$ of number of lattice points (also referred to as 'a current predicted number of lattice points') associated with the current radius $r_s^{(i)}$;

comparing the current prediction $N_{pred}^{(i)}$ of number of lattice points to a given threshold denoted by $N_{th}$;

updating the current radius $r_s^{(i)}$ if the current prediction $N_{pred}^{(i)}$ of number of lattice points is strictly higher than the given threshold, i.e. if $N_{pred}^{(i)}>N_{th}$, the current radius $r_s^{(i)}$ being updated by applying a linear function $f(\bullet)$ to the current radius. Accordingly, the index of the iteration may be first updated such that $i=i+1$, then the current sphere radius may be updated such that $r_s^{(i)}=f(r_s^{(i-1)})$. In some embodiments, the linear function may have a slope parameter equal to ½ and an intercept parameter equal to zero.

The stopping condition being satisfied if the current prediction $N_{pred}^{(i)}$ of number of lattice points is smaller than or equal to the given threshold $N_{th}$. Once the stopping condition is satisfied, the search sphere radius $r_s$ may be set to the last updated current radius $r_s^{(N_{iter})}$ that is associated with the current predicted number $N_{pred}^{(N_{iter})}$ of lattice points that satisfies the stopping condition such that $N_{pred}^{(N_{iter})} \leq N_{th}$.

Performance of the Sphere Decoder using the provided sphere radius determination devices and methods has been evaluated in terms of bit error rate, average processing time, and average number of lattice points inside the spherical region. 'NN-SD' refers to the Sphere Decoder implementation in which the search sphere radius is determined using deep neural networks, 'SDIRS' refers to the Sphere Decoder implementation in which the search sphere radius is determined based on noise statistics, and 'SSD' refers to the Sphere Decoder implementation in which the search sphere radius is determined according to a linear function of the signal to noise ratio without processing a machine learning algorithm. 8×8 and 16×16 MIMO systems using 16-QAM modulations are considered. Multilayer deep neural networks made up of one input layer, one hidden layer, and one output layer are used.

Figure 8:
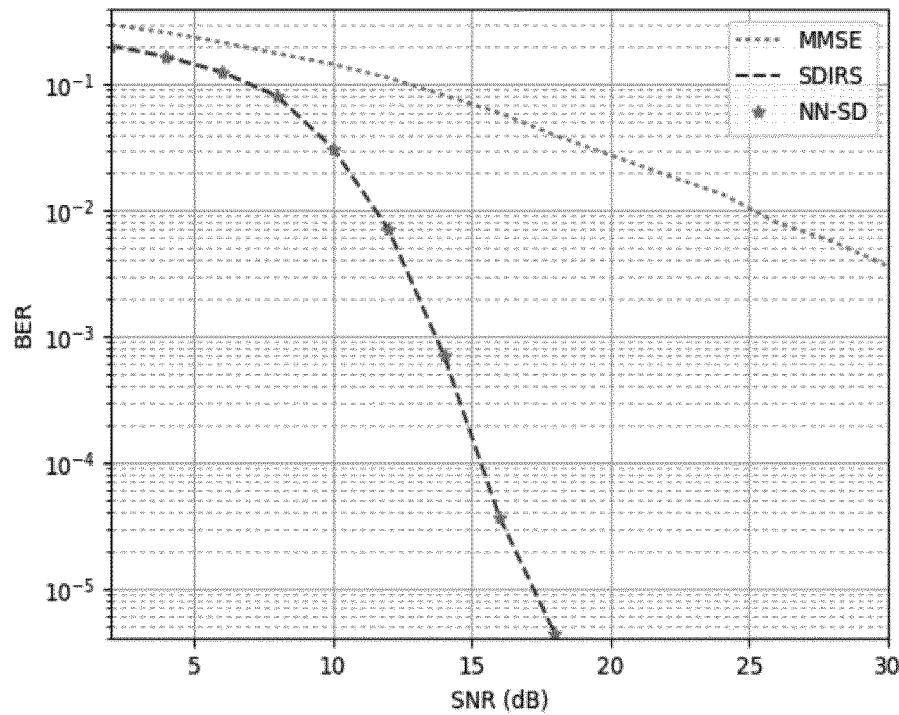
FIG. 8 is a diagram illustrating the bit error rate performance as function of the signal to noise ratio obtained according to some embodiments of the invention.

FIG. 8 shows diagrams evaluating the bit error rate (BER) performance as function of the signal-to-noise ratio for the SDIRS, the NN-SD, and the MMSE decoders obtained for a 8×8 MIMO system. Numerical results show that NN-SD provides optimal ML performance.

Figure 9:
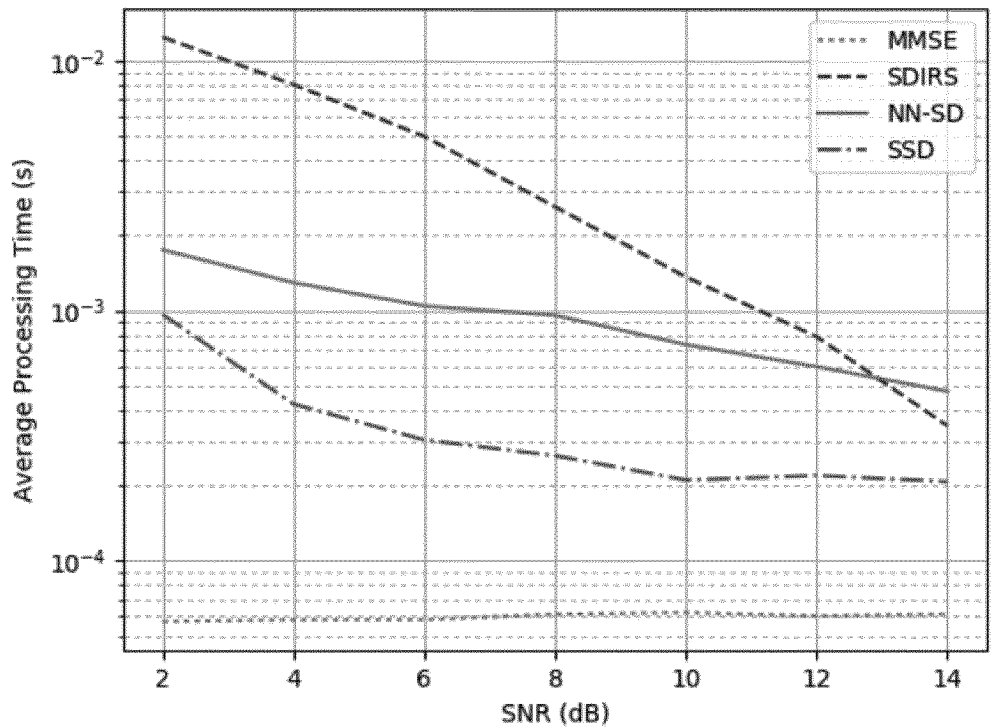
FIG. 9 is a diagram illustrating the average processing time as function of the signal to noise ratio obtained for the MMSE, the SDIRS, the NN-SD, and the SSD decoders, for 8×8 MIMO systems, according to some embodiments of the invention.
Figure 10:
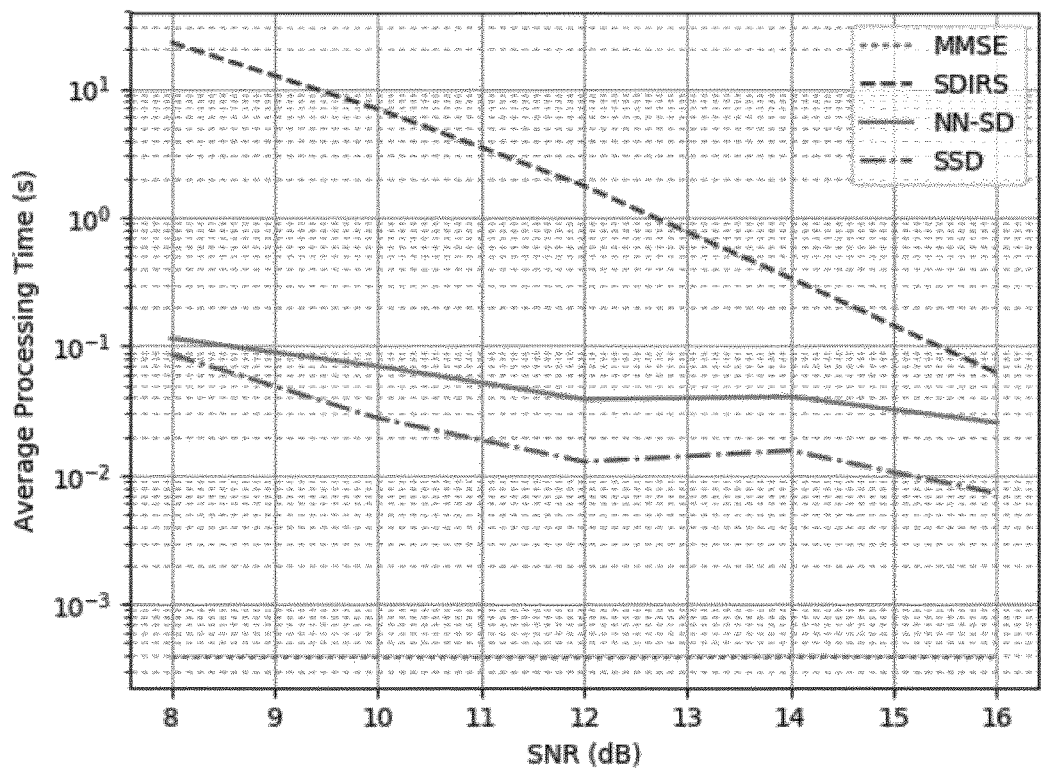
FIG. 10 is a diagram illustrating the average processing time as function of the signal to noise ratio obtained for the MMSE, the SDIRS, the NN-SD, and the SSD decoders, for 16×16 MIMO systems, according to some embodiments of the invention

FIGS. 9 and 10 show diagrams evaluating the average processing time as function of the signal to noise ratio obtained for the MMSE, the SDIRS, the NN-SD, and the SSD decoders, for 8×8 and 16×16 MIMO systems respectively. Numerical results show that NN-SD greatly reduces the decoding time compared to existing SDIRS. This processing time reduction is provided given the choice of the search sphere radius that expects a threshold on the number of lattice points to be visited during the search phase. The gain of processing time and computational complexity is significant as the dimension of the MIMO system increases.

Figure 11:
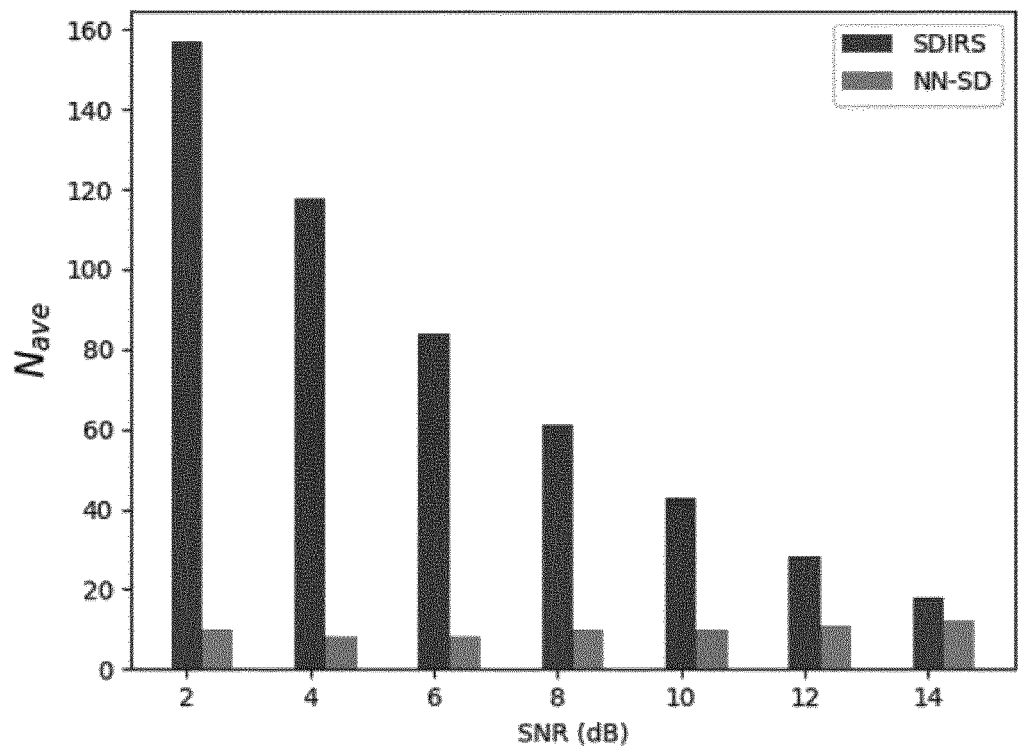
FIG. 11 is a diagram illustrating the average number of lattice points falling inside the spherical region as function of the signal to noise ratio obtained for the SDIRS and the NN-SD decoders for 8×8 MIMO systems, according to some embodiments of the invention.
Figure 12:
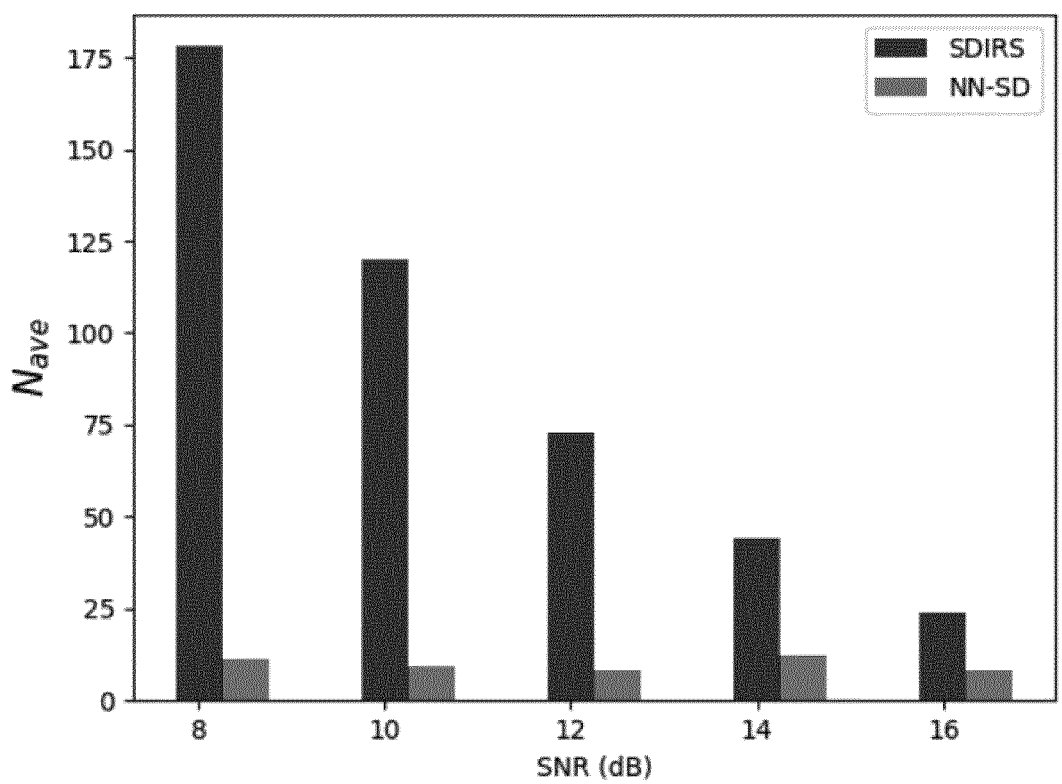
FIG. 12 is a diagram illustrating the average number of lattice points falling inside the spherical region as function of the signal to noise ratio obtained for the SDIRS and the NN-SD decoders for 16×16 MIMO systems, according to some embodiments of the invention.

FIGS. 11 and 12 show diagrams evaluating the average number of lattice points falling inside the spherical region as function of the signal to noise ratio obtained for the SDIRS and the NN-SD decoders, respectively for 8×8 and 16×16 MIMO systems. Numerical results show that the average number of lattice points is almost constant function of the signal to noise ratio using the NN-SD, while it is higher using the SDIRS decoder for low to moderate signal to noise ratio values.

Although the embodiments of the invention have been described mainly with reference to symmetric MIMO configurations characterized by a same number of transmit and receive antennas, it should be noted that the invention may also be applied to asymmetric MIMO configurations with $n_t < n_r$.

Further, while some embodiments of the invention have been described in relation to a wireless single-user MIMO system, it should be noted that the invention is not limited to such an application. The invention may be integrated in any receiver device operating in any linear communication system characterized by a linear representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular communications applied in 3G, 4G, LTE, WiFi™, and future 5G standard or the like. Cooperative communications applied for example in ad-hoc networks (wireless sensor networks, machine-to-machine communications, internet of things (IoT), etc) are also examples of distributed MIMO systems. In addition to wireless networks, the present invention may be integrated in optical receiver devices implemented in optical fiber-based communication systems, such as Polarization Division Multiplexing-OFDM (PDM-OFDM) systems.

Further, the invention is not limited to communication devices and may be integrated into signal processing devices such as electronic filters of finite impulse response (FIR) used in audio applications like audio crossovers and audio mastering. Accordingly, some embodiments may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

The devices, methods, and computer program products described herein may be implemented by various means. For example, these techniques may be implemented in hardware, software, or a combination thereof. For a hardware implementation, the processing elements of the lattice prediction device 200 can be implemented for example according to a hardware-only configuration (for example in one or more FPGA, ASIC, or VLSI integrated circuits with the corresponding memory) or according to a configuration using both VLSI and Digital Signal Processor (DSP).

Furthermore, the method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A decoder configured to decode a signal received through a transmission channel represented by a channel matrix using a search sphere radius, the decoder comprising a radius determination device for determining said search sphere radius from a preliminary radius, wherein the radius determination device is configured to:
   i. apply a machine learning algorithm to input data derived from said received signal, said channel matrix and a current radius, the current radius being initially set to the preliminary radius, which provides a current predicted number of lattice points associated with said current radius;
   ii. compare said current predicted number of lattice points to a given threshold;
   iii. update said current radius if said current predicted number of lattice points is strictly higher than said given threshold, said current radius being updated by applying a linear function to said current radius;
   steps i to iii being iterated until a termination condition is satisfied, said termination condition being related to the current predicted number, the radius determination device being configured to set the search sphere radius to the current radius in response to the termination condition being satisfied.

2. The decoder of claim 1, wherein the termination condition is satisfied if the current predicted number of lattice points is smaller than or equal to said given threshold.

3. The decoder of claim 1, wherein the linear function has a slope parameter equal to ½ and an intercept parameter equal to zero.

4. The decoder of claim 1, wherein the machine learning algorithm is a supervised machine learning algorithm chosen in a group comprising Support Vector Machines, linear regression, logistic regression, naive Bayes, linear discriminant analysis, decision trees, k-nearest neighbor algorithm, neural networks, and similarity learning.

5. The decoder of claim 4, wherein the supervised machine learning algorithm is a multilayer deep neural network comprising an input layer, one or more hidden layers, and an output layer each layer comprising a plurality of computation nodes, said multilayer deep neural network being associated with model parameters and an activation function, said activation function being implemented in at least one computation node among the plurality of computation nodes of said one or more hidden layers.

6. The decoder of claim 5, wherein said activation function is chosen in a group comprising a linear activation function, a sigmoid function, a Relu function, the Tanh, the softmax function, and the CUBE function.

7. The decoder of claim 5, wherein the radius determination device is configured to previously determine said model parameters during a training phase from received training data, said radius determination device being configured to determine a plurality of sets of training data from said training data and expected numbers of lattice points, each expected number of lattice points being associated with a set of training data among said plurality of sets of training data, said training phase comprising two or more iterations of the following steps:
   processing said deep neural network using a set of training data among said plurality of training data as input, which provides an intermediate number of lattice points associated with said set of training data;
   determining a loss function from the expected number of lattice points and the intermediate number of lattice points associated with said set of training data, and
   determining updated model parameters by applying an optimization algorithm according to the minimization of said loss function.

8. The decoder of claim 7, wherein said optimization algorithm is chosen in a group comprising the Adadelta optimization algorithm, the Adagrad optimization algorithm, the adaptive moment estimation algorithm, the Nesterov accelerated gradient algorithm, the Nesterov-accelerated adaptive moment estimation algorithm, the RMSprop algorithm, stochastic gradient optimization algorithms, and adaptive learning rate optimization algorithms.

9. The decoder of claim 7, wherein said loss function is chosen in a group comprising a mean square error function and an exponential log likelihood function.

10. The decoder of claim 7, wherein the radius determination device is configured to previously determine said expected numbers of lattice points from said search sphere radius and said channel matrix by applying a list sphere decoding algorithm or a list spherical-bound stack decoder.

11. The decoder of claim 1, wherein the radius determination device is configured to determine said preliminary radius from at least one parameter among a noise variance, diagonal components of said channel matrix, and an Euclidean distance representing a distance between said received signal and an estimate vector, said estimate vector being determined by applying a suboptimal estimation algorithm, said suboptimal estimation algorithm being chosen in a group comprising a Zero-Forcing Decision Feedback Equalizer and a Minimum Mean Square Error estimation algorithm.

12. The decoder of claim 3, wherein the radius determination device is configured to determine the number of iterations of steps i to iii as a linear function of a signal to noise ratio, said linear function of the signal to noise ratio being defined by a slope coefficient and an intercept coefficient, said intercept coefficient being related to a transmit power, to said given threshold, and to a determinant of the channel matrix.

13. The decoder of claim 1, wherein the decoder further comprises a symbol estimation unit configured to determine at least one estimate of a vector of information symbols carried by the received signal by applying a sphere search-based estimation algorithm that determines said at least one estimate of vector of information symbols from lattice points found inside a spherical region centered at a point representing said received signal and defined by said search sphere radius.

14. The decoder of claim 13, wherein said sphere search-based estimation algorithm is chosen among a group comprising the sphere decoder and the spherical-bound stack decoder.

15. A method for decoding a signal received through a transmission channel represented by a channel matrix using a search sphere radius, the method comprises determining said search sphere radius from a preliminary radius, wherein the method comprises:
  i. applying a machine learning algorithm to input data derived from said received signal, said channel matrix and a current radius, the current radius being initially set to the preliminary radius, which provides a current predicted number of lattice points associated with said current radius;
  ii. comparing said current predicted number of lattice points to a given threshold;
  iii. updating said current radius if said current predicted number of lattice points is strictly higher than said given threshold, said current radius being updated by applying a linear function to said current radius;
  steps I to iii being iterated until a termination condition is satisfied, said termination condition being related to the current predicted number, the method comprises setting the search sphere radius to the current radius in response to the termination condition being satisfied.

* * * * *

UNITED STATES PATENT AND TRADEMARK OFFICE
CERTIFICATE OF CORRECTION

PATENT NO. : 11,888,655 B2
APPLICATION NO. : 17/620715
DATED : January 30, 2024
INVENTOR(S) : Ghaya Rekaya et al.

It is certified that error appears in the above-identified patent and that said Letters Patent is hereby corrected as shown below:

In the Claims

In Claim 15, Column 33, Line 25, "steps I to iii" should be --steps i to iii--.

Signed and Sealed this
Nineteenth Day of March, 2024

Katherine Kelly Vidal
*Director of the United States Patent and Trademark Office*